United States Patent
Javaregowda et al.

(10) Patent No.: US 9,008,039 B2
(45) Date of Patent: Apr. 14, 2015

(54) MOBILE PHONE/DOCKING STATION CALL CONTINUITY

(75) Inventors: Gowtham Javaregowda, Waltham, MA (US); Elliot G. Eichen, Arlington, MA (US); Lee N. Goodman, Tyngsboro, MA (US); Sujin Catherine Chang, Stow, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 487 days.

(21) Appl. No.: 13/116,123

(22) Filed: May 26, 2011

(65) Prior Publication Data

US 2012/0155445 A1    Jun. 21, 2012

Related U.S. Application Data

(63) Continuation-in-part of application No. 12/971,409, filed on Dec. 17, 2010.

(51) Int. Cl.
*H04L 1/00* (2006.01)
*H04L 29/06* (2006.01)
*H04W 36/00* (2009.01)

(52) U.S. Cl.
CPC ........ *H04L 65/1069* (2013.01); *H04L 65/1083* (2013.01); *H04W 36/0022* (2013.01)

(58) Field of Classification Search
CPC ... H04L 47/767; H04L 67/48; H04L 65/1069; H04L 65/1083; H04W 8/087; H04W 28/0226; H04W 36/033; H04W 36/12; H04W 36/14; H04W 36/18; H04W 36/24; H04W 40/36; H04W 36/0022

USPC ................ 370/221, 331; 455/442, 426.2, 461
See application file for complete search history.

(56) References Cited

U.S. PATENT DOCUMENTS

| | | | |
|---|---|---|---|
| 6,148,074 A | 11/2000 | Miloslavsky et al. | |
| 6,327,470 B1 * | 12/2001 | Ostling .......................... | 455/437 |
| 7,110,789 B1 | 9/2006 | Curtiss et al. | |
| 7,120,241 B1 | 10/2006 | Fuoss et al. | |
| 7,143,198 B2 | 11/2006 | Lee et al. | |
| 7,400,886 B2 * | 7/2008 | Sahim et al. .................. | 455/444 |
| 2003/0039242 A1 | 2/2003 | Moore | |
| 2004/0128554 A1 | 7/2004 | Maher et al. | |
| 2005/0025129 A1 * | 2/2005 | Meier ........................... | 370/352 |
| 2005/0090271 A1 | 4/2005 | Sylvain | |
| 2005/0186960 A1 | 8/2005 | Jiang | |
| 2005/0227666 A1 | 10/2005 | Cheng | |
| 2006/0120329 A1 * | 6/2006 | Kim et al. ...................... | 370/331 |
| 2006/0187900 A1 | 8/2006 | Akbar | |
| 2006/0229101 A1 | 10/2006 | LaBauve et al. | |
| 2006/0242305 A1 | 10/2006 | Alnas | |
| 2007/0189264 A1 | 8/2007 | Liu | |

(Continued)

*Primary Examiner* — Ayaz Sheikh
*Assistant Examiner* — Mounir Moutaouakil

(57) ABSTRACT

A mobile device establishes a first network connection via a first communication interface when the mobile device is in a first docking status with a docking station. The mobile device sends Voice over Internet Protocol (VoIP) traffic associated with a VoIP call via the first network connection, and activates a second network connection via a second communication interface when the mobile device is in the first docking status, where the second network connection is different than the first network connection. The mobile device re-directs the VoIP traffic via the previously activated second network connection based on a change in docking status of the mobile device with the docking station to a second docking status.

23 Claims, 26 Drawing Sheets

(56) References Cited

U.S. PATENT DOCUMENTS

| | | |
|---|---|---|
| 2008/0056472 A1 | 3/2008 | Tanemura et al. |
| 2008/0139222 A1 | 6/2008 | Falvo et al. |
| 2008/0151875 A1 | 6/2008 | Lim |
| 2008/0278894 A1 | 11/2008 | Chen et al. |
| 2009/0001173 A1 | 1/2009 | Sevier et al. |
| 2009/0022301 A1 | 1/2009 | Mudaliar |
| 2009/0023442 A1 | 1/2009 | Ahmed et al. |
| 2009/0059907 A1 | 3/2009 | Sindhwani et al. |
| 2009/0097629 A1 | 4/2009 | Huslak et al. |
| 2009/0163139 A1 | 6/2009 | Wright-Riley |
| 2009/0305683 A1 | 12/2009 | Gupta et al. |
| 2010/0074247 A1 | 3/2010 | Clark et al. |
| 2010/0130169 A1 | 5/2010 | Narayanaswamy et al. |
| 2010/0157990 A1 | 6/2010 | Krzyzanowski et al. |
| 2010/0250818 A1 | 9/2010 | Gill et al. |
| 2011/0040858 A1 | 2/2011 | Gum |
| 2011/0053643 A1 | 3/2011 | Shmunis |
| 2011/0098087 A1 | 4/2011 | Tseng |
| 2011/0206052 A1 | 8/2011 | Tan et al. |
| 2011/0287820 A1 | 11/2011 | Harrison et al. |
| 2012/0057565 A1* | 3/2012 | Mani .......................... 370/331 |
| 2012/0099566 A1 | 4/2012 | Laine et al. |
| 2012/0303476 A1 | 11/2012 | Krzyzanowski et al. |

* cited by examiner

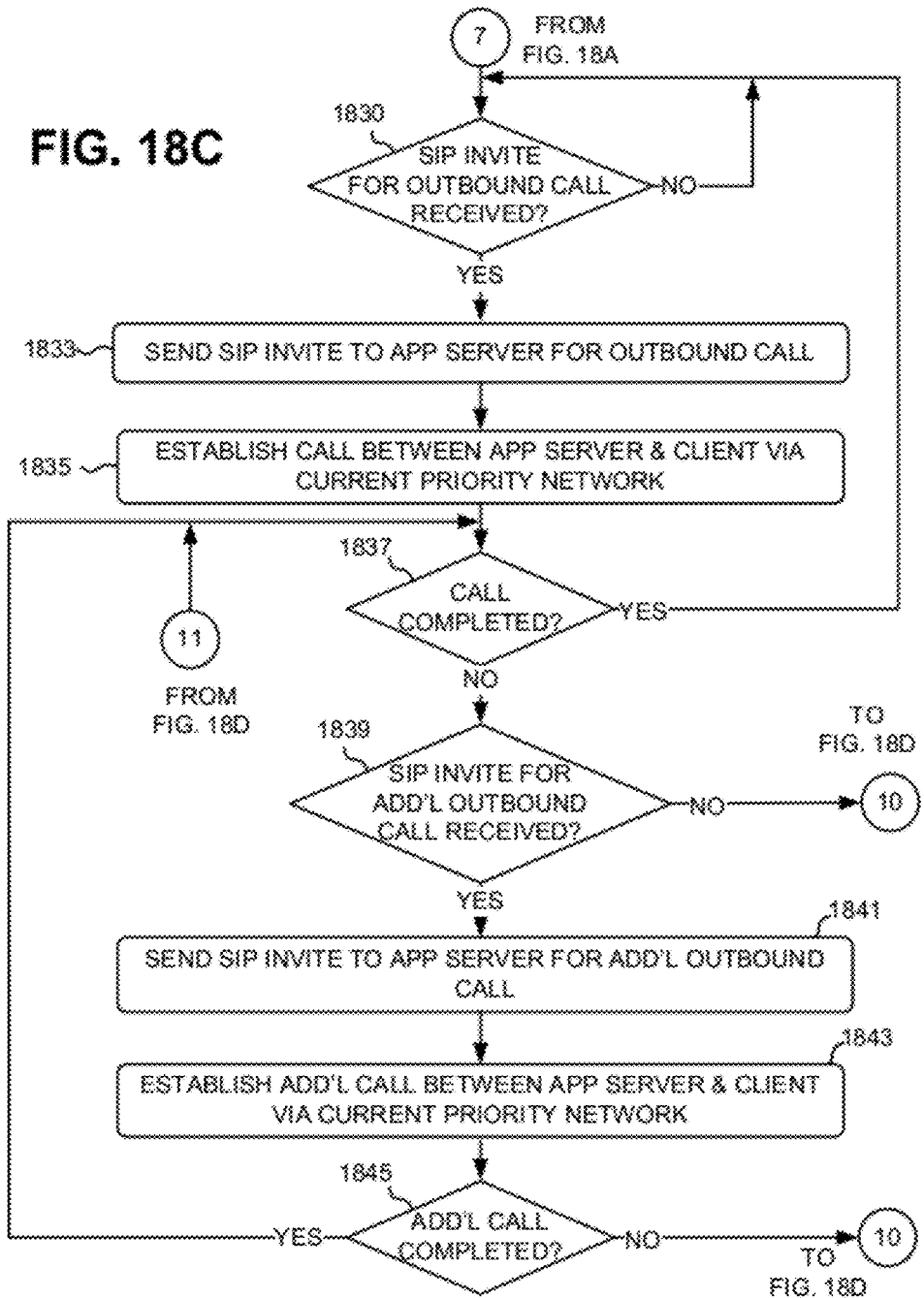

MOBILE PHONE/DOCKING STATION CALL CONTINUITY

RELATED APPLICATION

The present application is a continuation-in-part (CIP) of U.S. application Ser. No. 12/971,409, entitled "Mobile Phone Docking Station for VoIP" and filed Dec. 17, 2010, the disclosure of which is hereby incorporated by reference herein in its entirety.

BACKGROUND

A recent trend for reducing service costs in telecommunications networks involves the use of Voice over Internet Protocol (VoIP) for carrying calls between source and destination phones. IP networks typically incur minimal costs to carry data from sources to destinations, as opposed to Public Switched Telephone Networks (PSTN) which typically incur much higher costs to carry phone calls from sources to destinations. By using VoIP (e.g., IP packets carrying audio data) for carrying a call for most of the distance of the call, instead of using a PSTN, the cost of the call can be reduced relative to having a PSTN carry the entirety of the call. Usually, VoIP involves a call being carried via the Internet to a point in the PSTN very close to the call destination. At that point, the call is switched to the PSTN for completion of the connection with the call destination. By minimizing the distance that the call is carried on the PSTN, the cost of the call may be substantially reduced relative to solely using the PSTN for the entirety of the call.

BRIEF DESCRIPTION OF THE DRAWINGS

FIGS. 18A-18D are flow diagrams that illustrate an exemplary process for the registration of multiple, different networks, and the maintenance of call continuity via the multiple networks from the standpoint of the outbound proxy of FIG. 10.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In embodiments described herein, VoIP calls in progress at a mobile device may be selectively re-routed at the mobile device from a first network connection to a back-up, second network connection based on a docking status of the mobile device with a docking station, or based on a loss of connectivity of the first network connection. If docked in the docking station, the mobile device may send VoIP traffic associated with the VoIP call via the docking station and a wired connection between the docking station and a wired network. While engaged in the VoIP call via the wired connection, the mobile device may activate an available back-up network connection, such as, for example, a back-up wireless connection (e.g., a "wi-fi" or cellular data connection). If the mobile device is undocked from the docking station during the VoIP call, then the mobile device may re-direct the VoIP call via the back-up wireless connection such that VoIP call continuity is maintained. Thus, no significant gap, or loss of quality, in the VoIP call should occur when a docking status of the mobile device is changed.

In additional embodiments described herein, a client may register via every active network that is available to the client, and a call in progress may be selectively re-routed via one of the registered networks based on a loss of access to one of the registered networks. SIP invite or SIP re-invite messages may be used, subsequent to registration, to route/re-route inbound or outbound calls via the registered networks when a loss of access occurs. In these additional embodiments, moving a call between networks can be accomplished quickly since there is no need to wait for the client to register with the network at the time of the transitioning of the call.

Figure 1:
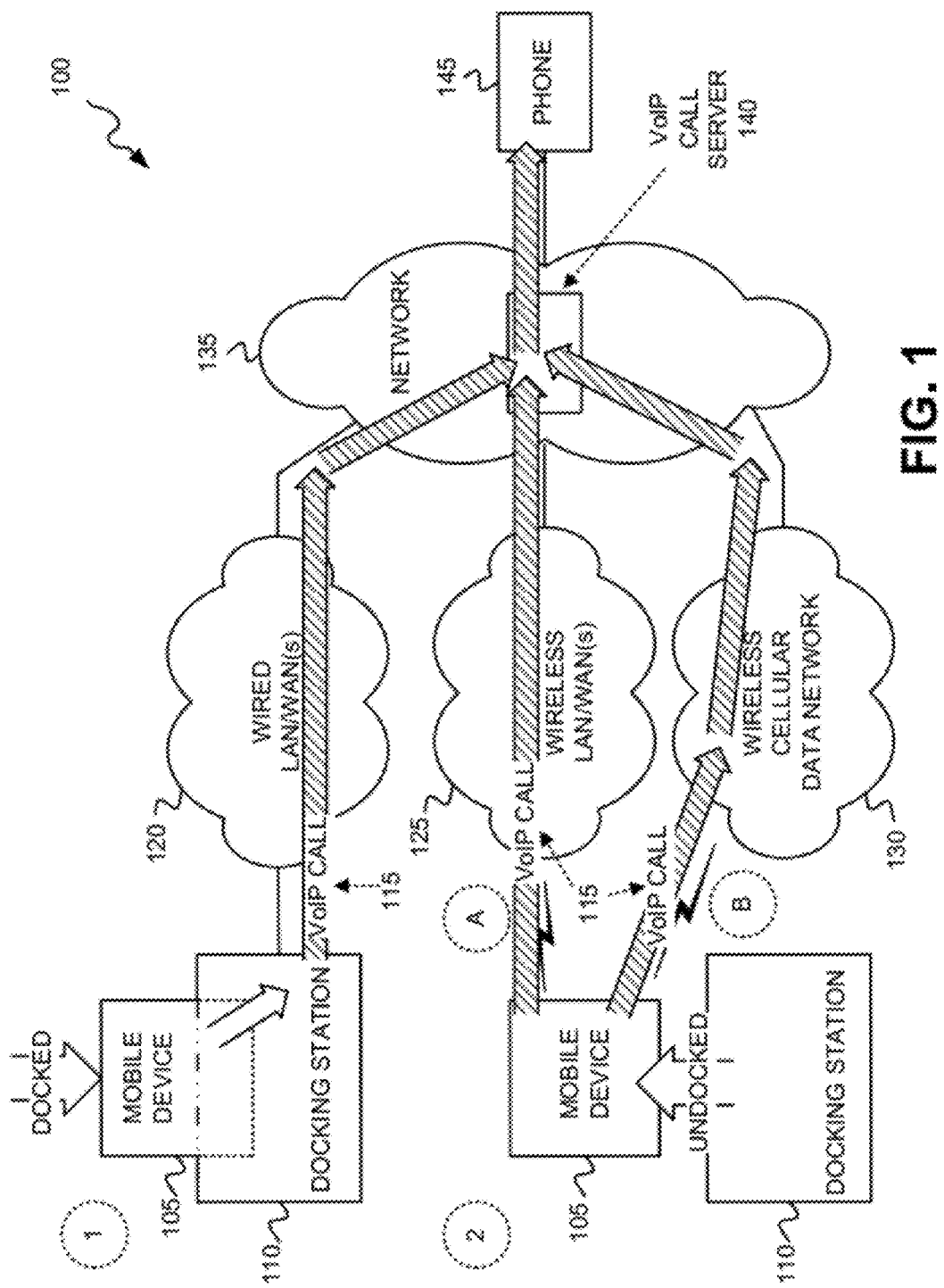
FIG. 1 is a diagram that depicts an exemplary network environment in which VoIP call continuity may be maintained when a mobile device is docked with, or undocked from, a mobile device docking station.

FIG. 1 is a diagram that depicts an exemplary network environment 100 in which a mobile device 105 may maintain VoIP call continuity when mobile device 105 is docked with, or undocked from, a docking station 110. Mobile device 105 may include, for example, a cellular telephone (e.g., a smart phone), a tablet computer, a personal digital assistant (PDA), or other type of digital computing device that has the capability to communicate via multiple different network connections. Docking station 110 may include a Voice over Internet Protocol (VoIP) phone that has a connection to a VoIP network and which also has a docking port which permits mobile device 105 to be "docked" with docking station 110.

FIG. 1 depicts an example of a circumstance in which VoIP call continuity may need to be maintained to avoid the dropping of a VoIP call. FIG. 1 depicts the maintenance of VoIP call continuity in the circumstance where mobile device 105 has been docked in docking station 110 (e.g., physically inserted into a docking port as designated with a "1" within a dashed circle in FIG. 1) and has been engaged in a VoIP call 115 via a network connection to a wired local area network (LAN)/wide area network (WAN) 120, and then is undocked from docking station 110 (designated with a "2" within a dashed circle in FIG. 1) and maintains the continuity of the VoIP call via a network connection to either wireless LAN/WAN 125 or wireless cellular data network 130.

While docked in docking station 110, a network connection via wired LAN/WAN 120 may be available to mobile device 105 via docking station 110. Therefore, a VoIP client application at mobile device 105 may determine that the wired connection is available via LAN/WAN network 120, and may route VoIP call 115 from mobile device 105 through docking station 110 via wired LAN/WAN 120. Routing VoIP call 115 from mobile device 105 through wired LAN/WAN 120 may include sending Session Initiation Protocol (SIP) register and invite messages to establish a session via the wired connection. Wired LAN/WAN 120 may include a corporate LAN/WAN, and/or other type of LAN/WAN (e.g., a home office LAN/WAN), that may include a wired Ethernet or IP network. VoIP call 115 may traverse wired LAN/WAN 120, a network 135 and a VoIP call server 140 to reach a destination phone 145.

Network 135 may include one or more networks that implement Ethernet protocol or Internet Protocol (IP). Network 135 may include a telecommunications network (e.g., a Public Switched Telephone Network (PSTN)), a local area network (LAN), a wide area network (WAN), a metropolitan area network (MAN), an intranet, the Internet, or a cable network (e.g., an optical cable network). VoIP call server 140 may include a VoIP call handling server that processes and forwards VoIP calls towards the call destination (or from a call destination to mobile device 105).

Mobile device 105 may, when engaging in a VoIP call via a wired connection, also activate a second wireless connection via wireless LAN/WAN 125 or wireless cellular data network 130. Activation of the second wireless connection may include powering on an appropriate communication interface at mobile device 105 and establishing wireless connectivity with networks 125 or 130 via the appropriate communication interface. Activation of the back-up, second wireless connection, therefore, implements a "make before break" connection such that the second wireless connection is made prior to any loss of connectivity of the first wired connection.

Mobile device 105 may be undocked (e.g., physically removed from the docking port) from docking station 110, as depicted with a "2" within a circle in FIG. 1. While undocked from docking station 110, the second wireless connection, via wireless LAN/WAN 125 or wireless cellular data network 130, the connectivity of which has already been established, may be available to mobile device 105. Wireless LAN/WAN 125 may include a wireless LAN based on IEEE 802.11 standards (i.e., a "wi-fi" network) or other standards/protocols. Wireless cellular data network 130 may include a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs) that includes a packet-switched network, such as, for example, a General Packet Radio Service (GPRS), a Cellular Digital Packet Data (CDPD), or a Mobile IP network.

The VoIP client application at mobile device 105 may determine that mobile device 105 has been undocked from docking station 110 and that there has been a loss of network connectivity via wired LAN/WAN 120. The VoIP client application at mobile device 105 may then maintain the continuity of VoIP call 115 by re-directing VoIP call 115 via either wireless LAN/WAN 125 or wireless cellular data network 130. Re-directing VoIP call 115 from mobile device 105 through wireless LAN/WAN 125 or wireless cellular data network 130 may include sending Session Initiation Protocol (SIP) re-register and re-invite messages to establish a session via the wireless connection. As shown in FIG. 1, VoIP call 115 may traverse wireless LAN/WAN 125 or wireless cellular data network 130, network 135 and VoIP call server 140 to reach destination phone 145.

Thus, as depicted in FIG. 1, a VoIP call 115 initiated by docked mobile device 105 through docking station 110 and a first, wired network connection via wired LAN/WAN 120 may be re-directed over a second wireless connection via wireless LAN/WAN 125 or wireless cellular data network 130. The continuity of VoIP call 115 may, therefore, be maintained such that no substantial gap, or loss of quality, in the call may occur.

Figure 2A:
FIGS. 2A and 2B are diagrams that depict an exemplary docking station in which a mobile device may be docked.
Figure 2B:

FIGS. 2A and 2B depict an example of a physical configuration of docking station 110, mobile device 105, and a mobile device tray 200, and the physical interconnection of docking station 110, mobile device 105, and mobile device tray 200. Mobile device tray 200 may include a physical configuration that fits the external configuration of mobile device 105, such that mobile device 105 may be inserted into mobile device tray 200. In addition, mobile device 105's Universal Serial Bus (USB) port (or other connector ports) may interconnect with an appropriate physical and electrical port on mobile device tray 200. Subsequent to insertion of mobile device 105 into mobile device tray 200, tray 200 may be inserted into a docking port 210 of docking station 110 to complete the USB port interconnection between mobile device 105 and docking station 110. FIG. 2B depicts mobile device 105 inserted into docking port 210 of docking station 110. While docked in docking station 110, mobile device 105 may be used for controlling the operation of docking station 110. For example, if mobile device 105 has a touch panel display, then the touch panel display may be used for dialing a VoIP call, instead of using a keypad on docking station 110.

Figure 3:
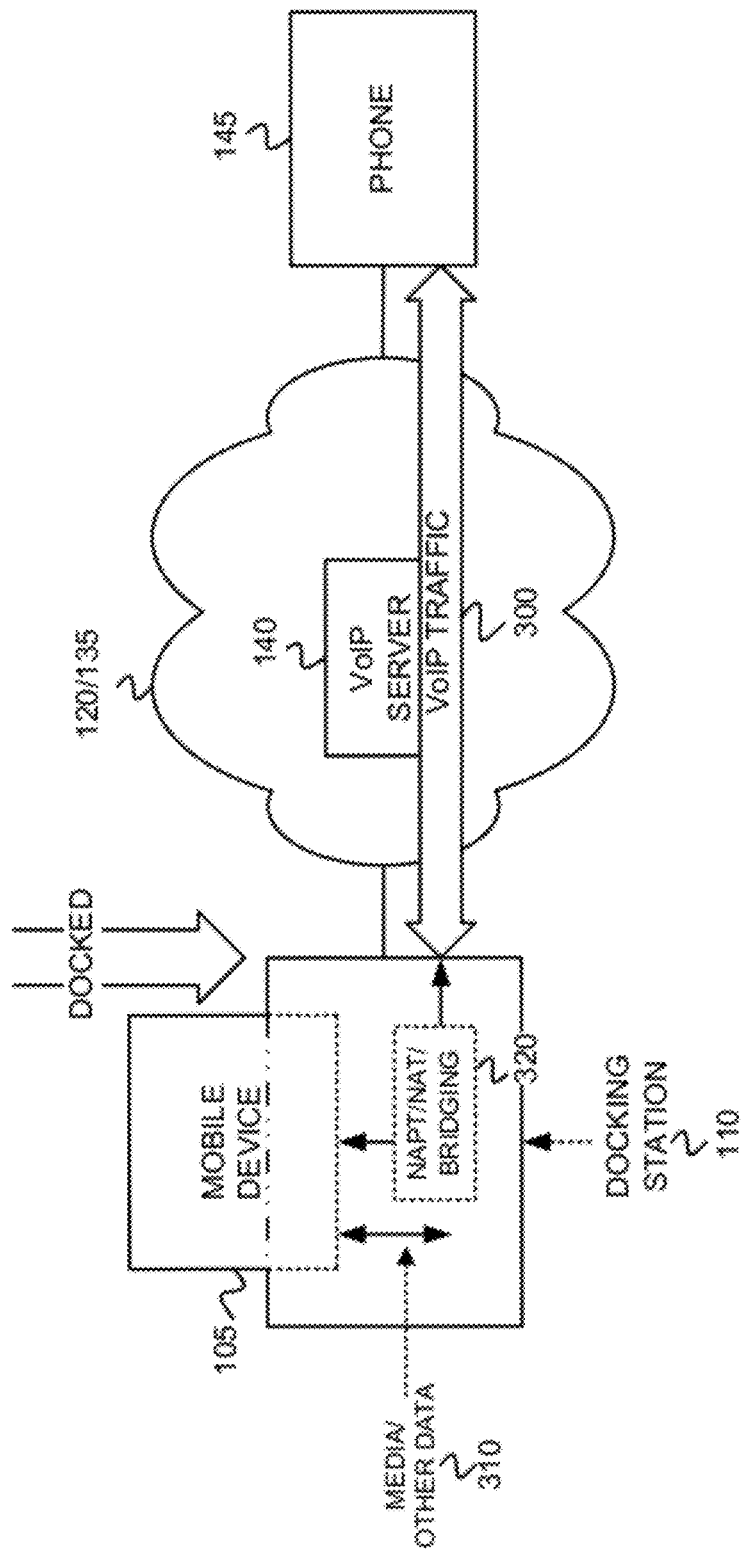
FIG. 3 is a diagram that depicts the exemplary docking station of FIG. 1 enabling a VoIP connection between a docked mobile device and a network.

FIG. 3 depicts circumstance number "1" of FIG. 1, where mobile device 105 is docked with docking station 110, and mobile device 105 sends a VoIP call using VoIP traffic 300 via wired LAN/WAN 120 and network 135. As shown in FIG. 3, mobile device 105 may be docked (i.e., physically inserted into a docking port) with docking station 110. Upon being docked with docking station 110, mobile device 105 may exchange media (e.g., audio or video) or other data 310 with docking station 110. The exchanged media 310 may include audio streamed from a microphone of docking station 110 to mobile device 105, or from a microphone of mobile device 105 to docking station 110. The exchanged media may further include video streamed from a camera (or memory) of docking station 110 to mobile device 105, or from a camera (or memory) of mobile device 105 to docking station 110.

As further shown in FIG. 3, docking station 110 may connect to wired LAN/WAN 120 and network 135 for sending and/or receiving VoIP traffic 300 to/from mobile device 105 via VoIP server 140. Docking station 110 may forward VoIP traffic 300 from network 120/135 to mobile device 105, and from mobile device 105 to network 120/135 via a system 320 that implements Network Address Port Translation (NAPT), Network Address Translation (NAT) or a bridging mode. When implementing NAPT or NAT, system 320 may route packets associated with VoIP traffic 300 to/from mobile device 105. A side or port of docking station 110 facing network 120/135 may have a public, routable Internet Protocol (IP) address on network 120/135, while a side or port of docking station 110 facing mobile device 105 may have a statically configured private IP address. The routable IP address of docking station 110 facing network 120/135 may be statically configured, or may be obtained via the Dynamic Host Configuration Protocol (DHCP) from network 120/135. Mobile device 105 may have a statically configured private IP address (e.g., on a same network as the private IP address of docking station 110). Mobile device 105 may use the routable IP address of docking station 110 as a default gateway for sending VoIP packets to phone 145 via network 120/135 and VoIP server 140. A physical and layer 2 connection between docking station 110 and mobile device 105 may include Ethernet over Universal Serial Bus (USB) (e.g., Ethernet frames encapsulated in USB packets). Media 310 may be streamed from the private IP address associated with mobile device 105 to the private IP address associated with docking station 110, or may be streamed in the reverse direction.

When implementing the bridging mode, system 320 may forward packets, at layer 2, from network 120/135, though docking station 110, to mobile device 105. Additionally, system 320 may forward packets, at layer 2, from mobile device 105, though docking station 110, to network 120/135. Docking station 110 may have an IP address, routable in network 120/135, and mobile device 105 may also have a different IP address that is routable in network 120/135. System 320, implementing the bridging mode, may forward packets received at docking station 110 from network 120/135 to the routable IP address of mobile device 105. Additionally, when implementing the bridging mode, system 320 may forward packets, received from mobile device 105 at the routable IP address of docking station 110, to network 120/135.

Figure 4:
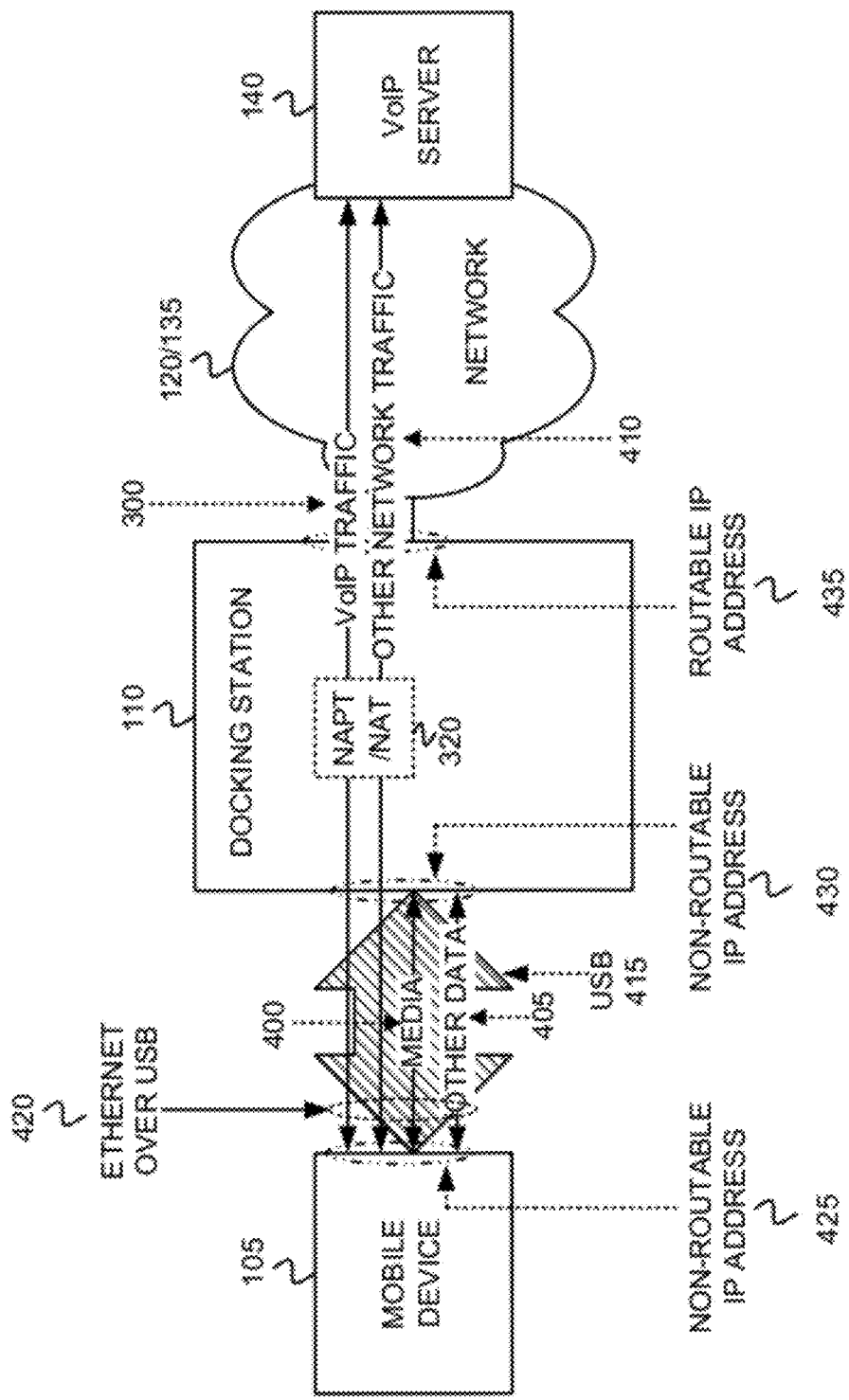
FIG. 4 is a diagram that depicts an exemplary implementation of the docking station of FIG. 1 in which the docking station implements Network Address and Port Translation or Network Address Translation for establishing a VoIP connection between a mobile device and a network.

FIG. 4 is a diagram that depicts an exemplary implementation of docking station 110 of FIG. 1 in which docking station 110 implements NAPT or NAT for establishing a VoIP connection between mobile device 105 and network 120/135. When mobile device 105 is docked into docking station 110, as shown in FIG. 1, media 400, other data 405, VoIP traffic 300 and other network traffic 410 may be sent to and from mobile device 105 via a Universal Serial Bus (USB) 415, as further shown in FIG. 4. Mobile device 105, therefore, acts as a USB peripheral, and docking station 110 acts as a USB host. Ethernet over USB protocol 420 may be used as the physical and layer 2 connection between docking station 110 and mobile device 105.

As shown in FIG. 4, mobile device 105 may have a statically configured IP address 425 that is non-routable from network 120/135 (but routable between IP address 430 of docking station 110 and IP address 425 of mobile device 105). As further shown in FIG. 4, docking station 110 may also have a statically configured IP address 430 that is non-routable from network 120/135 (but routable between IP address 430 of docking station 110 and IP address 425 of mobile device 105), where IP address 430 resides on a same private network (not shown) on which IP address 425 of mobile device 105 resides. A private network (not shown in FIG. 4), therefore, exists between mobile device 105 and docking station 110 via USB 415.

As further shown in FIG. 4, docking station 110 may have an IP address 435 that is routable from network 120/135. Routable IP address 435 may be statically configured, or may be obtained via the DHCP protocol from network 120/135. Docking station 110 may, therefore, act as a DHCP server to mobile device 105, thereby obtaining routable IP address 435 that may be used by network 120/135 to forward VoIP traffic 300 and other network traffic 410 to mobile device 105 via NAPT/NAT system 320. Non-routable, private IP address 425 on mobile device 105 and non-routable, private IP address 430 on docking station 110 may be statically configured prior to the connection of mobile device 105 to docking station 110 via USB 415. By having a routable IP address 435 on network 120/135, a network administrator may manage docking station 110 including, for example, providing software upgrades, firewall management, etc. The ability to address docking station 110 from network 120/135 may not be available when docking station 110 acts as an IP bridge (e.g., the exemplary bridging implementation of FIG. 5).

Media 400 may include audio or video data (e.g., streaming audio or video) that may be streamed from mobile device 105 for playback on docking station 110, or that may be streamed from docking station 110 for playback on mobile device 105. Media 400 may be streamed from mobile device 105 IP address 425 to docking station IP address 430, or from docking station IP address 430 to mobile device 105 IP address 425. Other data 405 may include keypad information (e.g., indications of keypad presses on docking station 110), status information (e.g., voicemail message indicator light, etc.), and other information that may be exchanged between mobile device 105 IP address 425 and docking station 110 IP address 430. Other data 405 may further include data other than audio or video data, such as, for example, web traffic data. The transfer of media 400 and/or other data 405 may be through sockets, such as Transmission Control Protocol (TCP) or User Datagram Protocol (UDP) sockets.

VoIP traffic 300 may include VoIP signaling traffic (e.g., Session Initiation Protocol (SIP) traffic) and VoIP media traffic (e.g., Real-time Transport Protocol (RTP) or RTP Control Protocol (RTCP)) and may be forwarded through docking station 110 via NAPT/NAT system 320. NAPT/NAT system 320 may implement a forwarding table that forwards packets to/from mobile device 105 through docking station 110 to routable network 120/135. For VoIP applications, the forwarding table may be configured to pass SIP and RTP or RTCP traffic to/from mobile device 105 to routable network 120/135. Additionally, other network traffic 410 may be forwarded to/from mobile device 105 through docking station 110 to routable network 120/135 by the forwarding table based on NAPT or NAT filtering. Other network traffic 410 may include Internet traffic (e.g., web browsing), etc. NAPT/NAT system 320 may receive packets from IP address 425 of mobile device 105 sent to routable IP address 435 of docking station 110, and the forwarding table may forward the packets to an appropriate next hop IP address in network 120/135 (e.g., to a next hop switch or router). NAPT/NAT system 320 may further receive packets from an IP address in network 120/135 sent to routable IP address 435, and the forwarding table may forward the packets to non-routable IP address 425 of mobile device 105. A network administrator of network 120/135 may designate what kinds of traffic are permissible, and the forwarding table at docking station 110 may be configured appropriately (e.g., e-mail and web browsing may be forwarded whereas other undesirable traffic may be blocked during the forwarding process). A forwarding table implemented at mobile device 105 may use routable IP address 435 of docking station 110 as the default gateway address for all outgoing packets.

Figure 5:
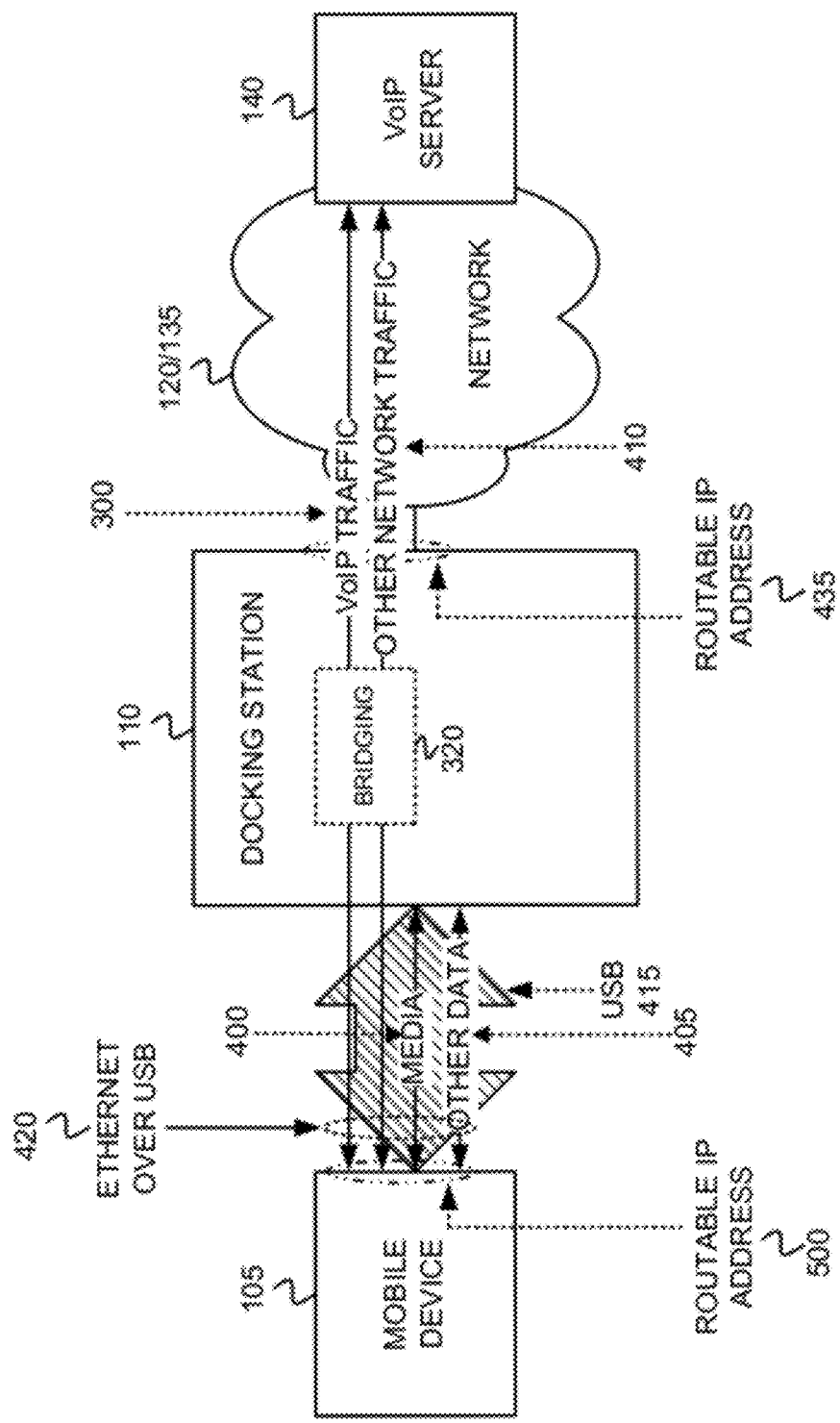
FIG. 5 is a diagram that depicts an exemplary implementation of the docking station of FIG. 1 in which the docking station implements a bridging mode for establishing a VoIP connection between the mobile device and a network.

FIG. 5 is a diagram that depicts an exemplary implementation of docking station 110 of FIG. 1 in which docking station 110 implements a bridging mode for establishing a VoIP connection between mobile device 105 and network 120/135. When mobile device 105 is docked into docking station 110, as shown in FIG. 1, media 400, other data 405, VoIP traffic 300 and other network traffic 410 may be sent to and from mobile device 105 via a Universal Serial Bus (USB) 415, as further shown in FIG. 5. Mobile device 105, therefore, acts as a USB peripheral, and docking station 110 acts as a USB host. Ethernet over USB protocol 420 may be used as the physical and layer 2 connection between docking station 110 and mobile device 105.

As shown in FIG. 5, mobile device 105 may have an IP address 500 that is routable from network 120/135. As further shown in FIG. 5, docking station 110 may also have a IP address 435 that is routable from network 120/135. Routable IP addresses 500 and 435 may be statically configured, or may be obtained via the DHCP protocol from network 120/135. Docking station 110 may, therefore, act as a DHCP server to mobile device 105, thereby obtaining routable IP addresses 500 and 435 that may be used by network 120/135 to forward VoIP traffic 300 and other network traffic 410 to mobile device 105 via bridging system 320.

Media 400 may be streamed from mobile device 105 for playback on docking station 110, or may be streamed from docking station 110 for playback on mobile device 105. Media 400 may be streamed from mobile device 105 IP address 500 to docking station IP address 435, or from docking station IP address 435 to mobile device 105 IP address 500. Other data 405 may include keypad information, status information, and other information that may be exchanged between mobile device IP address 500 and docking station 110 IP address 435.

VoIP traffic 300 may include VoIP signaling traffic (e.g., SIP traffic) and VoIP media traffic (e.g., RTP or RTCP) and may be forwarded through docking station 110 via bridging system 320. Bridging system 320 may forward, at layer 2, packets to/from mobile device 105 through docking station 110 to routable network 120/135. Bridging system 320 may "transparently" forward packets, without any NAPT or NAT filtering as performed in the implementation of FIG. 4, from mobile device 105 to network 120/135 and from network 120/135 to mobile device 105. For example, if network wired LAN/WAN 120 includes an Ethernet Local Area Network (LAN), bridging system 320 may forward Ethernet frames from network 120/135 to mobile device 105 based on Medium Access Control (MAC) addresses contained in the Ethernet frames.

Figure 6:
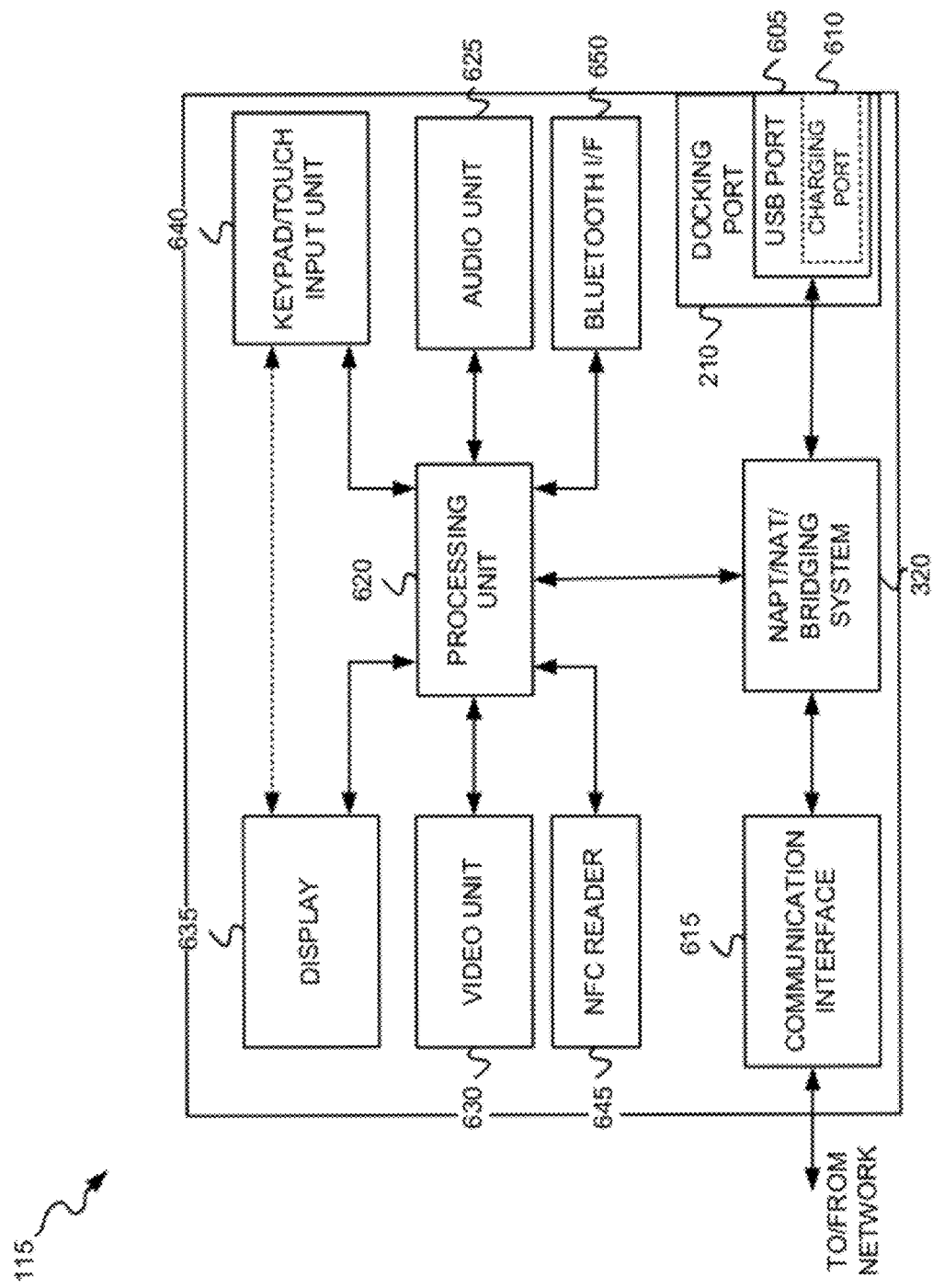
FIG. 6 is a diagram that depicts exemplary components of the docking station of FIG. 1.

FIG. 6 is a diagram that depicts exemplary components of docking station 110. Docking station 110 may include docking port 210, NAPT/NAT/Bridging system 320, a communication interface 615, a processing unit 620, an audio unit 625, a video unit 630, a display 635, a keypad/touch input unit 640, a Near Field Communication (NFC) reader 645, and a Bluetooth interface 650.

Docking port 210 may include a port that may physically engage with a tray into which mobile device 105 is inserted. The shape and size of docking port 210 may be different based on a different external configuration of mobile device 105. Docking port 210 may further include a USB port 605, which also includes a charging port 610 (i.e., USB port 605 may simultaneously act as a data port and a battery charging port). Though a single USB port 605 is depicted in FIG. 6, docking station 110 may include multiple USB ports (not shown) and/or a USB hub. Charging port 610 may include an electrical connection for supplying a charging current to a battery of mobile device 105. USB port 605 may include an electrical connection for the USB that may interconnect docking station 110 with mobile device 105.

NAPT/NAT/bridging system 320 may include, in one exemplary implementation that corresponds to FIG. 4 above, a system on a chip (SOC) that implements NAPT or NAT which modifies network address information in incoming packets for the purpose of translating one IP address space into another (e.g., remaps routable public IP addresses into private, non-routable IP addresses). NAPT/NAT/bridging system 320, when implementing NAPT or NAT, may be used as a firewall to control traffic sent to mobile device 105 via docking station 110, thus, enhancing the security of, and control over, traffic carried by the docked mobile device 105. NAPT/NAT/bridging system 320 may include, in another exemplary implementation that corresponds to FIG. 5 above, a SOC that implements a bridging mode which may forward packets, at layer 2, from network 120/135, though docking station 110, to mobile device 105. Additionally, the SOC implementing the bridging mode may forward packets, at layer 2, from mobile device 105, though docking station 110, to network 120/135.

Communication interface 615 may include a transceiver for communicating with network 120/135. Processing unit 620 may include a processor, microprocessor, or processing logic that may interpret and execute instructions. The instructions may be stored in memory (not shown), such as, for example, a random access memory (RAM), a Read Only Memory (ROM), or another type of dynamic or static storage device that may store information and instructions for execution by processing unit 620.

Audio unit 625 may include a microphone for receiving audio input into docking station 110, and may include mechanisms for playback of audio data received from the microphone, or received from mobile device 105. Video unit 630 may include a camera for capturing video, and may further include mechanisms for playback of video data received from the camera, or received from mobile device 105. Display 635 may include a display device that may display video data or other types of data associated with the operation of docking station 110 or mobile device 105. In some implementations, display 630 may include a touch screen display that registers touch input at different locations upon the touch screen. Keypad/touch input unit 640 may include an alphanumeric keypad and mechanisms for receiving indications of touch input from display 630.

NFC reader 645 may include a short range, high frequency system that enables the short range (e.g., 10 centimeters) exchange of data with mobile device 105. When mobile device 105 is placed in proximity to docking station 110 (e.g., device 105 is inserted into docking port 210), NFC reader 645 may "read" device identity information from a corresponding NFC system located in device 105. In addition to device identity information, NFC reader 645 may also read device user identity information from the corresponding NFC system located in device 105. NFC reader 645 may, thus, be used to identify different mobile devices that may be placed in proximity to docking station 110. Bluetooth interface 650 may include a short wavelength system for connecting with, and exchanging data over short distances, with any type of Bluetooth enabled device. Bluetooth interface 650 may, for example, connect with a Bluetooth enabled audio headset that permits a wearer to listen to audio from audio unit 625.

The configuration of components of docking station 110 illustrated in FIG. 6 is for illustrative purposes only. Other configurations may be implemented. Therefore, docking station 110 may include additional, fewer and/or different components than those depicted in FIG. 6. For example, docking station 110 may include a system(s) for implementing an Ethernet switch (not shown in FIG. 6), and/or for implementing or interfacing with Virtual Local Area Networks (VLANs). Docking station 110 may further include a magnetic sensor that may detect the insertion of mobile device 105 into docking port 210 and may thereby initiate various functions at docking station 110 or at mobile device 105 (e.g., initiate execution of a VoIP application at mobile device 105, etc.).

Figure 7:
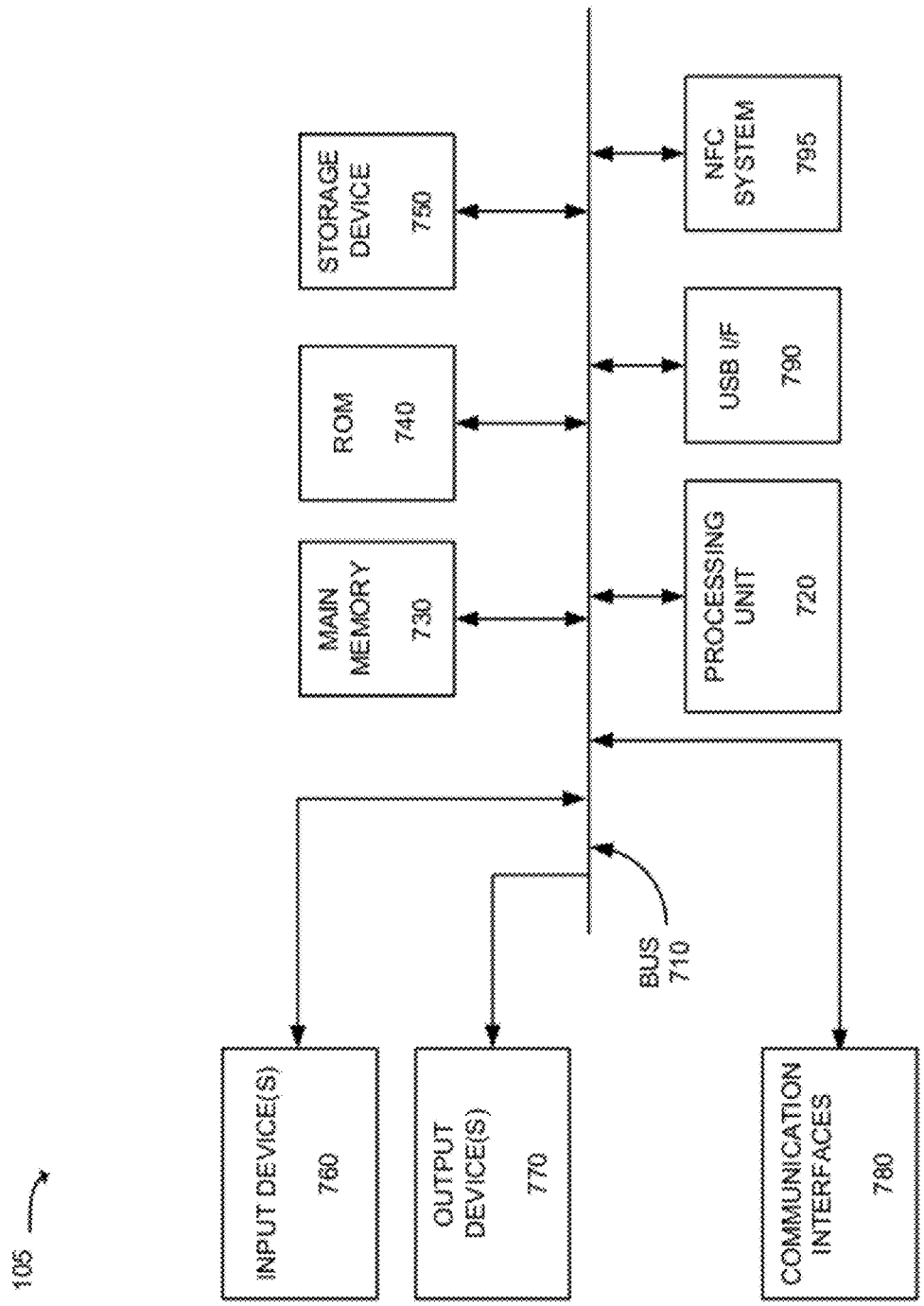
FIG. 7 is a diagram that depicts exemplary components of the mobile device of FIG. 1.

FIG. 7 is a diagram that depicts exemplary components of mobile device 105. Mobile device 105 may include a bus 710, a processing unit 720, a main memory 730, a read only memory (ROM) 740, a storage device 750, an input device(s) 760, an output device(s) 770, communication interfaces 780, a USB interface 790, and a NFC system 795. Bus 710 may include a path that permits communication among the elements of mobile device 105.

Processing unit 720 may include a processor, microprocessor, or processing logic that may interpret and execute instructions. Main memory 730 may include a random access memory (RAM) or another type of dynamic storage device that may store information and instructions for execution by processing unit 720. ROM 740 may include a ROM device or another type of static storage device that may store static information and instructions for use by processing unit 720. Storage device 750 may include a magnetic and/or optical recording medium.

Input device 760 may include one or more mechanisms that permit an operator to input information to mobile device 105, such as, for example, a keypad or a keyboard, voice recognition and/or biometric mechanisms, etc. Output device 770 may include one or more mechanisms that output information to the operator, including a display, a speaker, etc. Communication interfaces 780 may include multiple transceiver mechanisms that enable mobile device 105 to communicate with other devices and/or systems. For example, communication interfaces 780 may include a first radio frequency transceiver for communicating via wireless cellular data network 130. Additionally, communication interfaces 780 may include a second radio frequency transceiver for communication via wireless LAN/WAN 125. USB I/F 790 may include communication interface interconnection mechanisms to permit mobile device 105 to physically and electrically connect with USB port 605 of docking station 110. NFC system 795 may include a short range, high frequency system that enables the short range exchange of data to/from mobile device 105 to docking station 110. When mobile device 105 is placed in proximity to docking station 110 (e.g., device 105 is inserted into docking port 210), NFC system 795 may transmit device identity information and/or device user identity information that may be "read" by NFC reader 645 of docking station 110.

The configuration of components of mobile device 105 illustrated in FIG. 7 is for illustrative purposes only. Other configurations may be implemented. Therefore, mobile device 105 may include additional, fewer and/or different components than those depicted in FIG. 7. For example, mobile device 105 may include a Global Positioning System (GPS) unit that may be used for determining a location of mobile device 105.

Figure 8:
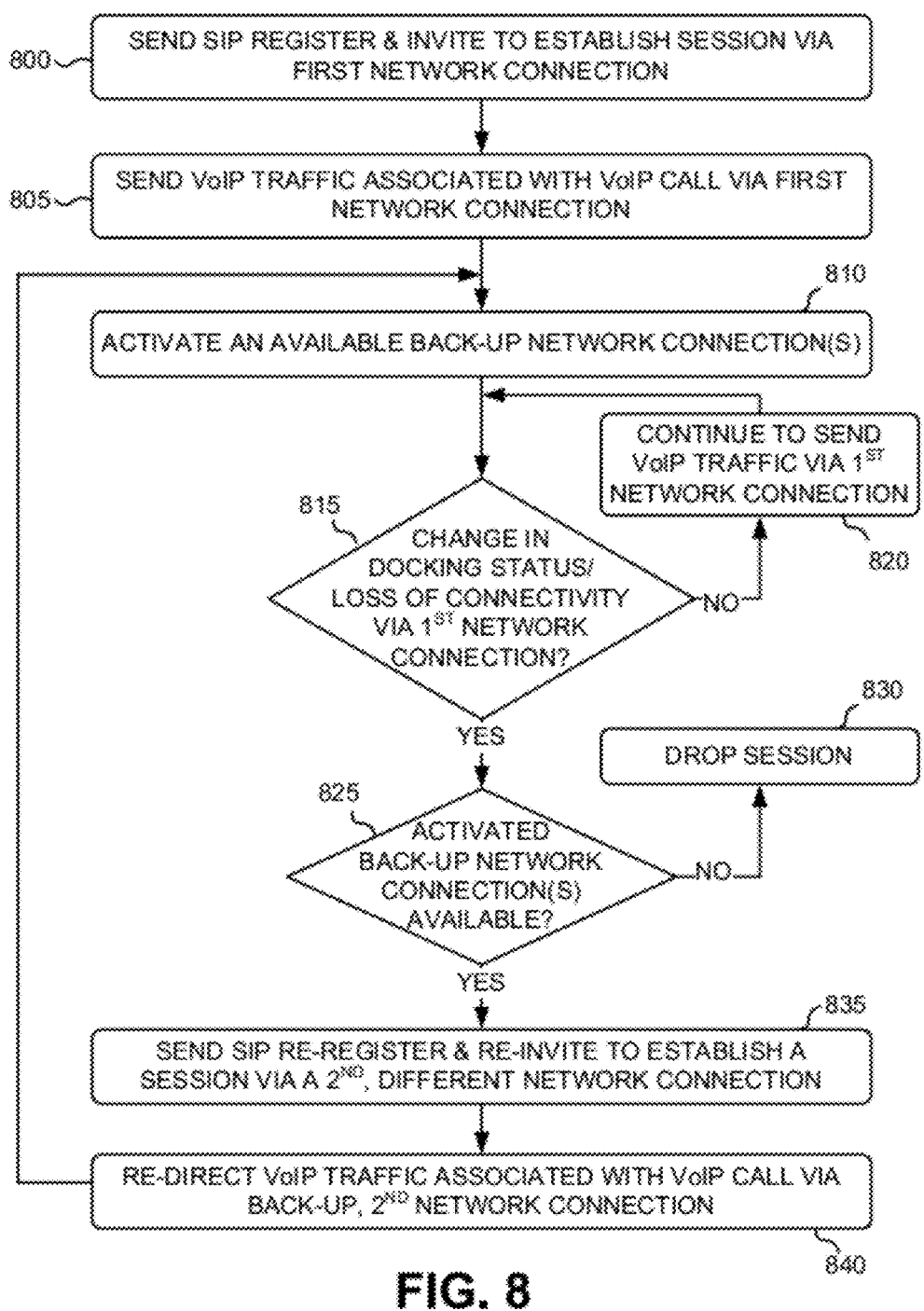
FIG. 8 is a flow diagram that illustrates an exemplary process for maintaining VoIP call continuity of a VoIP call engaged in by the mobile device of FIG. 1 based on a change in docking status of the mobile device or based on a loss of connectivity of a specific network connection of the mobile device.

FIG. 8 is a flow diagram that illustrates an exemplary process for maintaining VoIP call continuity based on a change in docking status of mobile device 105, or based on a loss of connectivity of a specific network connection of mobile device 105. The exemplary process of FIG. 8 may be implemented by mobile device 105.

Figure 9A:
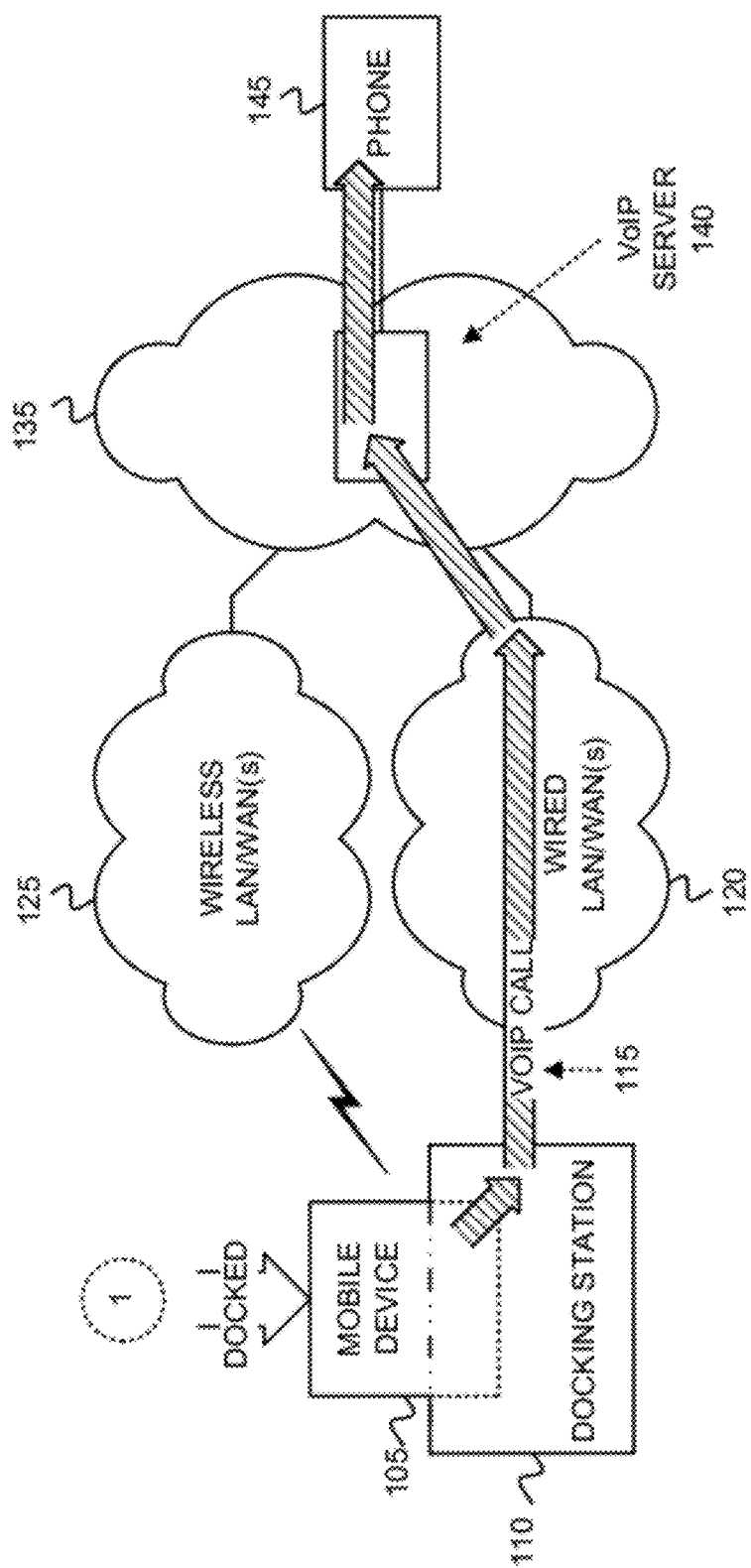
FIGS. 9A and 9B are diagrams that depict examples of VoIP call continuity when a mobile device is docked with, or undocked from, a mobile device docking station.

The exemplary process may include sending Session Initiation Protocol (SIP) register and invite messages to establish a session via a first network connection (block 800). A SIP user agent at mobile device 105 may send a SIP register message to a SIP registrar server to inform the SIP registrar of mobile device 105's current network address (e.g., IP address). The SIP user agent at mobile device 105 further may send a SIP invite message to request the establishment of a session. Referring to FIG. 9A, once mobile device 105 is docked with docking station 110, mobile device 105 may send SIP register and invite messages via docking station 110's wired connection to wired LAN/WAN 120. Mobile device 105 may send VoIP traffic associated with a VoIP call via the first network connection (block 805). FIG. 9A depicts mobile device 105 sending VoIP traffic associated with VoIP call 115 via the wired network connection to wired LAN/WAN 120. VoIP server 140 may receive the VoIP traffic of VoIP call 115 in network 135 and may forward VoIP call 115 to the destination phone 145.

Mobile device 105 may activate an available back-up network connection (block 810). One or more back-up network connections may be available to mobile device 105 including, for example, a wireless network connection to wireless LAN/WAN 125 or wireless cellular data network 130. The back-up network connection(s) may be available to mobile device 105 based on a docking status of mobile device 105 with docking station 110, or regardless of the docking status of mobile device 105. For example, if mobile device 105 is currently using a wireless connection with wireless cellular data network 130 for a VoIP call, then a back-up network connection may become available when mobile device 105 is docked with docking station 110, or a wireless backup connection may be available via wireless LAN/WAN 125. As another example, if mobile device 105 is currently docked with docking station 110 and using a wired connection via wired LAN/WAN 120, then a back-up connection may be available at any time using a wireless network connection via wireless cellular data network 130 or wireless LAN/WAN 125. Activation of the back-up, second wireless connection may include powering on an appropriate communication interface at mobile device 105 and establishing connectivity with networks 120, 125 or 130 via the appropriate communication interface. Activation of the back-up, second wireless connection, therefore, implements a "make before break" connection such that the second network connection is made prior to any loss of connectivity of the first network connection.

Mobile device 105 may determine whether a change in docking status of mobile device 105 with docking station 110 has occurred or whether a loss of connectivity of mobile device 105 has occurred via the first network connection (block 815). The change in docking status may include changing mobile device 105 from an undocked status to a docked status, or from a docked status to an undocked status. A loss of connectivity of mobile device 105 may occur when mobile device 105 is undocked from docking station 110 and the wired connection with wired LAN/WAN 120 is lost. Alternatively, a loss of connectivity of mobile device 105 may occur when a wireless signal strength between mobile device 105 and wireless LAN/WAN 125 or wireless cellular data network 130 becomes too low to sustain communication, or the wireless signal is lost in its entirety (e.g., communication interface failure, wireless network node failure, etc.).

If there has been no change in docking status or no loss of connectivity of the first network connection (NO—block 815), then mobile device 105 may continue to send the VoIP traffic via the first network connection (block 820) and the exemplary process may return to block 815. If a change in docking status of mobile device 105 has occurred or a loss of connectivity of mobile device 105 has occurred via the first network connection (YES—block 815), then mobile device 105 may determine if an activated back-up network connection is available (block 825). Mobile device 105 may ascertain that the back-up network connection activated in block 810 is still available before re-directing VoIP call 115 via the back-up network connection. In the case where more than one back-up network connection was activated in block 810, mobile device 105 may select one of the back-up network connections for maintaining VoIP call continuity (e.g., based on signal strength, signal quality, etc.).

Figure 9B:
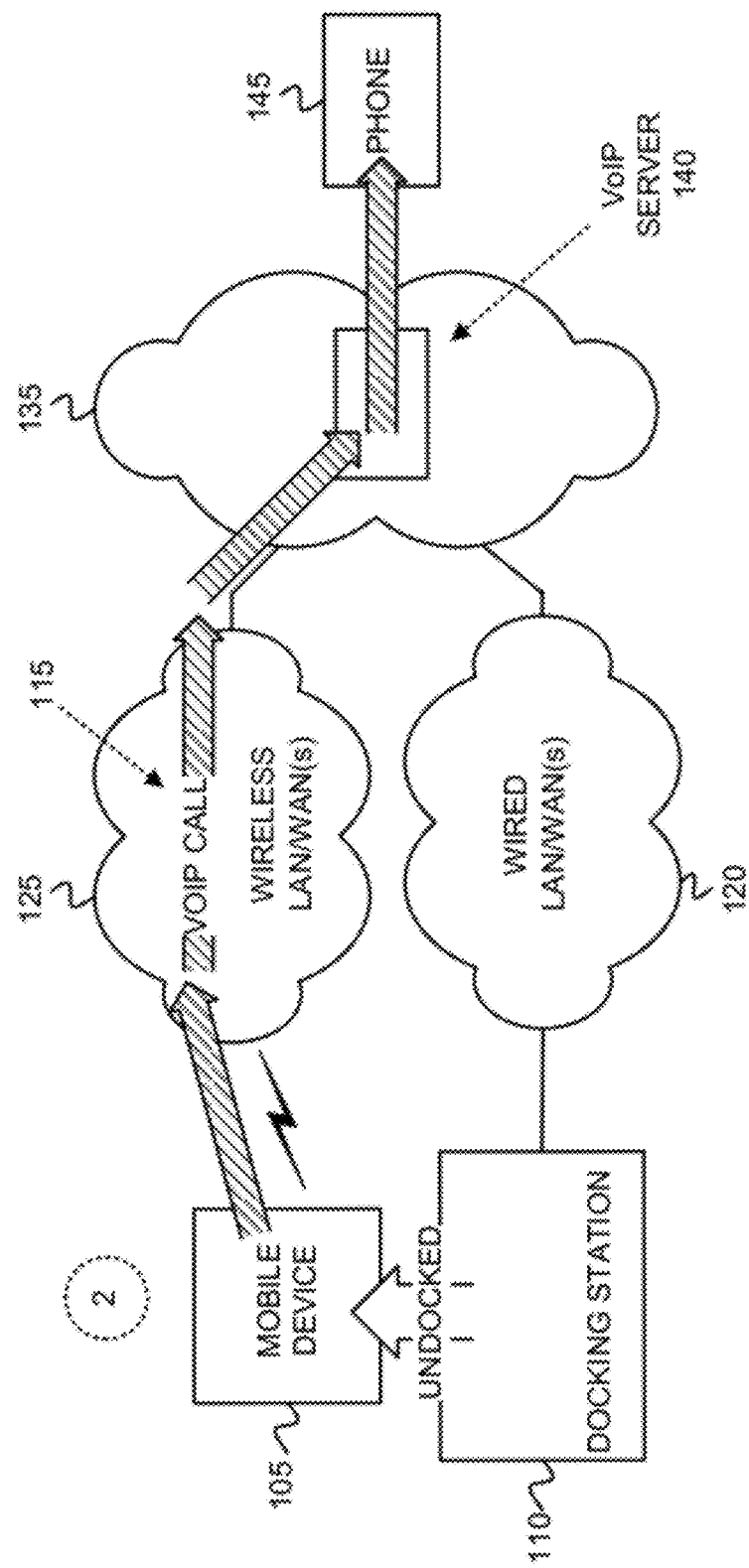

FIG. 9B depicts mobile device 105 being undocked from docking status 110, thus, resulting in a change in docking status that also causes a loss of connectivity of the wired connection to wired LAN/WAN 120. Alternatively, the change in docking status could be the reverse of that shown in FIGS. 9A and 9B. For example, mobile device 105 may be undocked from docking station 110 with a first network connection being via wireless LAN/WAN 125 or wireless cellular data network 130, and may then be docked with docking station 110 with a second network connection being via a wired connection via wired LAN/WAN 120.

If the back-up network connection activated in block 810 is no longer available (NO—block 825), then the current session may be dropped (block 830). If the activated back-up network connection is available (YES—block 825), then mobile device 105 may send SIP re-register and re-invite messages to establish a session via a back-up, second network connection that is different than the first network connection (block 835). If mobile device 105, as shown in FIG. 9A, initially has a first network connection via wired LAN/WAN 120, then the back-up, second network connection may be via a wireless connection to wireless LAN/WAN 125 or wireless cellular data network 130. Mobile device 105 may re-direct VoIP traffic associated with the VoIP call via the second network connection (block 840). FIG. 9B depicts VoIP call 115 being re-directed from wired LAN/WAN 120 (shown in FIG. 9A) to a wireless connection via wireless LAN/WAN 125. The exemplary process may continue at block 810 with the activation of one or more available back-up network connections in case mobile device 105 has another change in docking status, or has a loss of connectivity with the network connection used in block 840.

Figure 10:
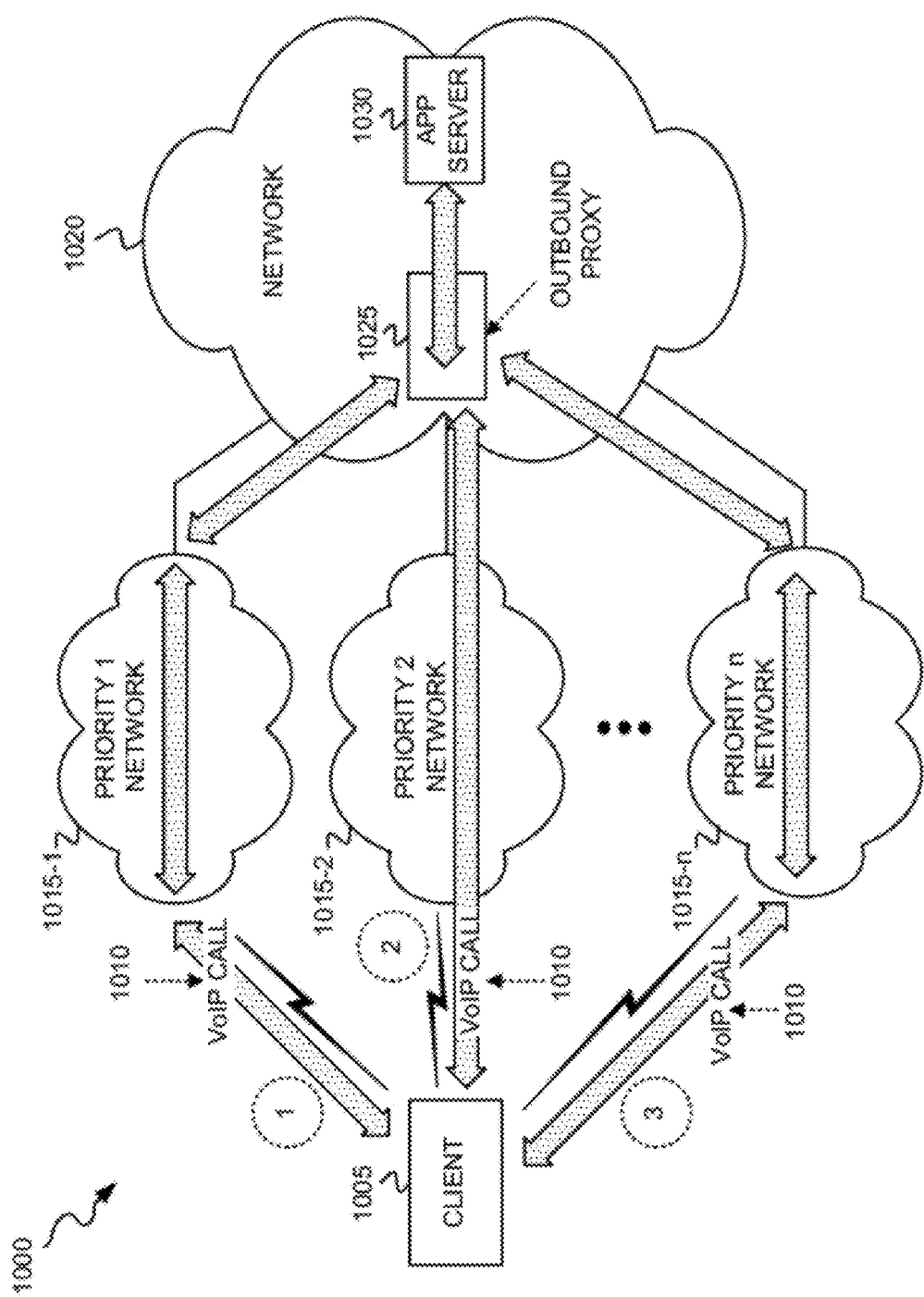
FIG. 10 is a diagram that depicts an exemplary network environment in which call/session continuity may be maintained through the use of active SIP registrations via possible networks available to a client.

FIG. 10 is a diagram that depicts an exemplary network environment 1000 in which call/session continuity may be maintained through the use of active SIP registrations along every possible network available to a client 1005. As shown in FIG. 10, client 1005 may maintain a VoIP call 1010 (or other type of IP session) via one of multiple different networks 1015-1 through 1015-n. Client 1005 may include, for example, a SIP client. VoIP call 1010 may transit to/from client 1005 via one of networks 1015-1 through 1015-n to/from network 1020. Network 1020 may include an outbound proxy 1025 that acts as an intermediate node which handles VoIP call 1010. Network 1020 may further include an application (app) server 1030 that may be the other endpoint of VoIP call 1010. Alternatively, app server 1030 may include another client (not shown) that may serve as an endpoint of VoIP call 1010.

As shown in FIG. 10, each of networks 1015-1 through 1015-n may have an assigned priority that indicates the relative priority among networks 1015-1 through 1015-n for carrying VoIP call 1010 between client 1005 and app server 1030. When a failure occurs over a current network (e.g., priority 1 network 1015-1) carrying VoIP call 1010, then VoIP call 1010 may be re-routed over the next priority network (e.g., priority 2 network 1015-2) to maintain the continuity of VoIP call 1010 between client 1005 and app server 1030. Failure of a current network may include a determination by client 1005 that it has lost access to the current network, a determination by outbound proxy 1025 that there has been no response from the current network (e.g., for a configurable period of time), or a determination by client 1005 or outbound proxy 1025 of poor Quality of Service (QoS) on the current network. Client 1005 may reside on a mobile device, such as mobile device 105 described above with respect to FIG. 1. Outbound proxy 1025 may include a network device, resident in network 1020, that handles and/or routes VoIP calls between app server 1030 and client 1005. Outbound proxy 1025 may include, for example, a session border controller (SBC), a gateway, or other type of network device that may interconnect networks 1015-1 through 1015-n to network 1020. App server 103 may include a network device that sends media data, via IP, to client 1005. The media data may include, for example, audio data (e.g., voice data), images, video data, and/or audio and video data. Network 1020 may include one or more networks that implement Ethernet protocol or Internet Protocol (IP). Network 1020 may include a telecommunications network (e.g., a PSTN), a LAN, a WAN, a MAN, an intranet, the Internet, or a cable network (e.g., an optical cable network).

FIG. 10 depicts the continuity of VoIP call 1010 being maintained via priority 1 network 1015-1, priority 2 network 1015-2 or priority n network 1015-n. To maintain VoIP call continuity via one of networks 1015-1 through 1015-n, client 1005 may send SIP registration messages (not shown) to outbound proxy 1025 via each of networks 1015-1 through 1015-n. Since active SIP registrations are maintained via each of networks 1015-1 through 1015-n, client 1005 and/or outbound proxy 1025 may quickly re-route VoIP call 1010 via a next priority network (e.g., from priority 1 network to priority 2 network, from priority 2 network to priority 3 network, etc.) such that the continuity of VoIP call 1010 is maintained between client 1005 and app server 1030.

Figure 11:
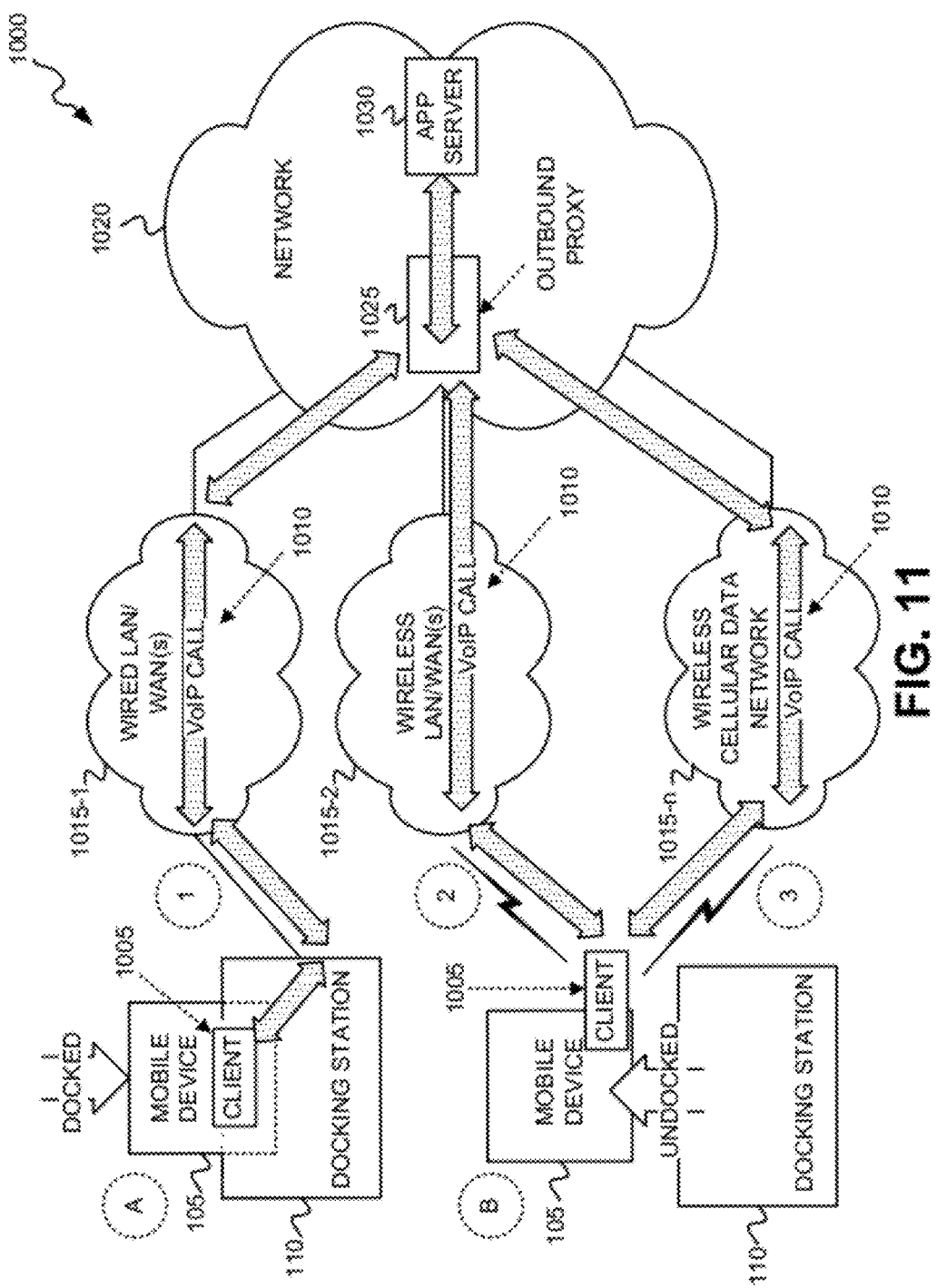
FIG. 11 is a diagram that illustrates the exemplary network environment of FIG. 10 where a first network includes a wired LAN/WAN(s), a second network includes a wireless LAN/WAN, and a third network includes a wireless cellular data network.

FIG. 11 illustrates the network environment 1000 of FIG. 10 where network 1015-1 includes a wired LAN/WAN(s), network 1015-2 includes a wireless LAN/WAN(s), and network 1015-n includes a wireless cellular data network(s). Wired LAN/WAN 120 may include a corporate LAN/WAN, and/or other type of LAN/WAN (e.g., a home office LAN/WAN), that may include a wired Ethernet or IP network. Wireless LAN/WAN 1015-2 may include a wireless LAN based on IEEE 802.11 standards (i.e., a "wi-fi" network) or other standards/protocols. Wireless cellular data network 1015-n may include a wireless PLMN (e.g., a CDMA 2000 PLMN, a GSM PLMN, a LTE PLMN and/or other types of PLMNs) that includes a packet-switched network, such as, for example, a GPRS, a CDPD, or a Mobile IP network. FIG. 11 additionally depicts the maintenance of call continuity of VoIP call 1010 in specific instances related to the docking state of a mobile device 105, which includes client 1005, relative to docking station 110. In a first instance (designated as an "A" in a dashed circle in FIG. 11) mobile device 105 may be docked with docking station 110 and client 1005 may send SIP register messages (as described below) via each of networks 1015-1 through 1015-n. Client 1005 may subsequently engage in VoIP call 1010 with app server 103 via wired LAN/WAN 1015-1. In a second instance (designated as a "B" in a dashed circle in FIG. 11), mobile device 105 may be un-docked from docking station 110, and client 1005 may engage in VoIP call 1010 with app server 1030 either via wireless LAN/WAN 1015-2 or via wireless cellular data network 1015-n. Client 1005 and/or outbound proxy 1025 may route VoIP call 1010 via wired LAN/WAN 1015-1, wireless LAN/WAN 1015-2 or wireless cellular data network 1015-n depending on the docking state of mobile device 105 within docking station 110. Therefore, the routing of VoIP call 1010 may change (e.g., from network 1015-1 to network 1015-2, or from network 1015-2 to 1015-1) based on whether mobile device 105 goes from an undocked state to a docked state with docking station 110, or from a docked state to an undocked state with docking station 110.

Figure 12:
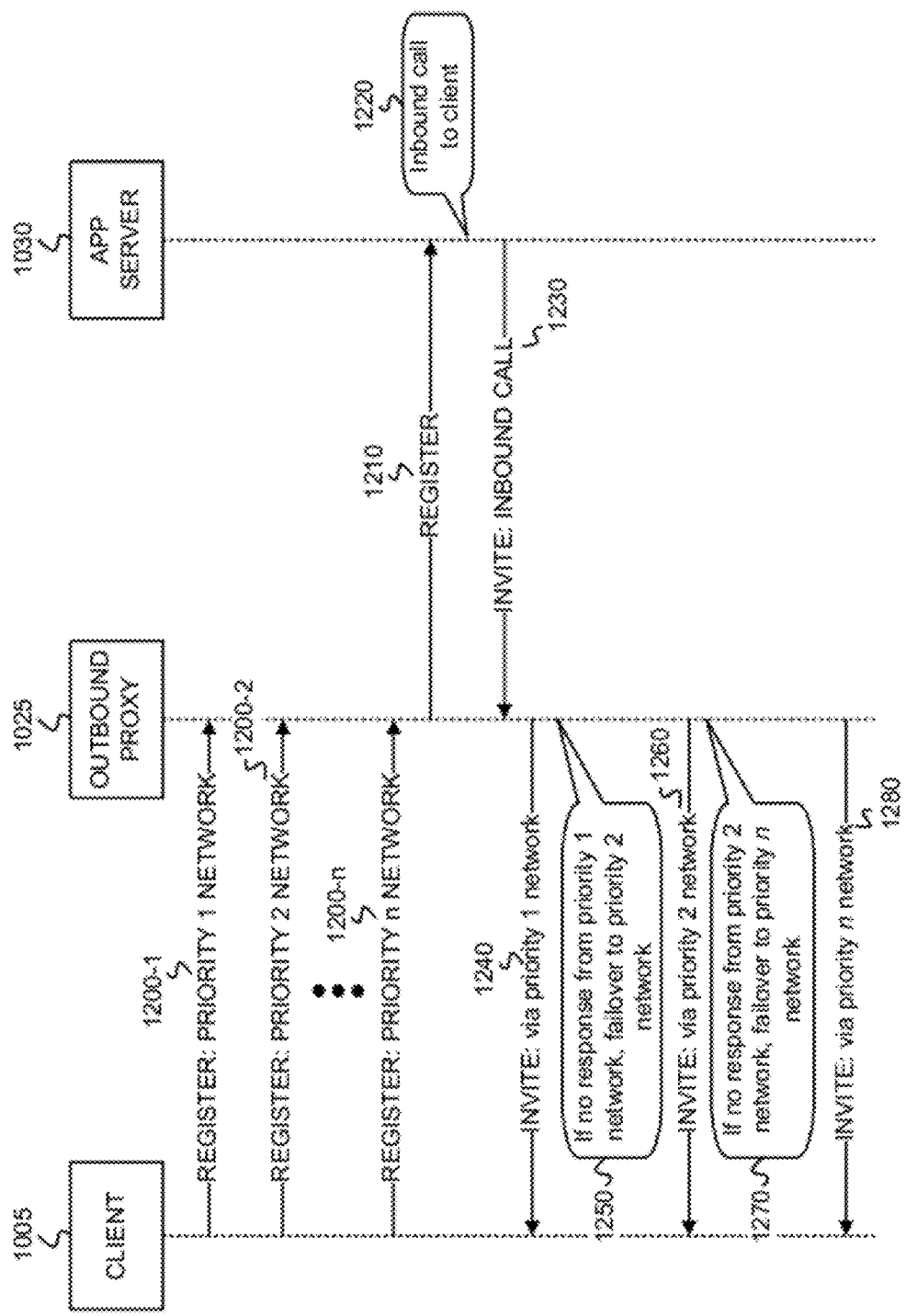
FIGS. 12-16 are diagrams that depict exemplary SIP messaging associated with routing a VoIP call(s) via one of multiple SIP registered networks.
Figure 13:
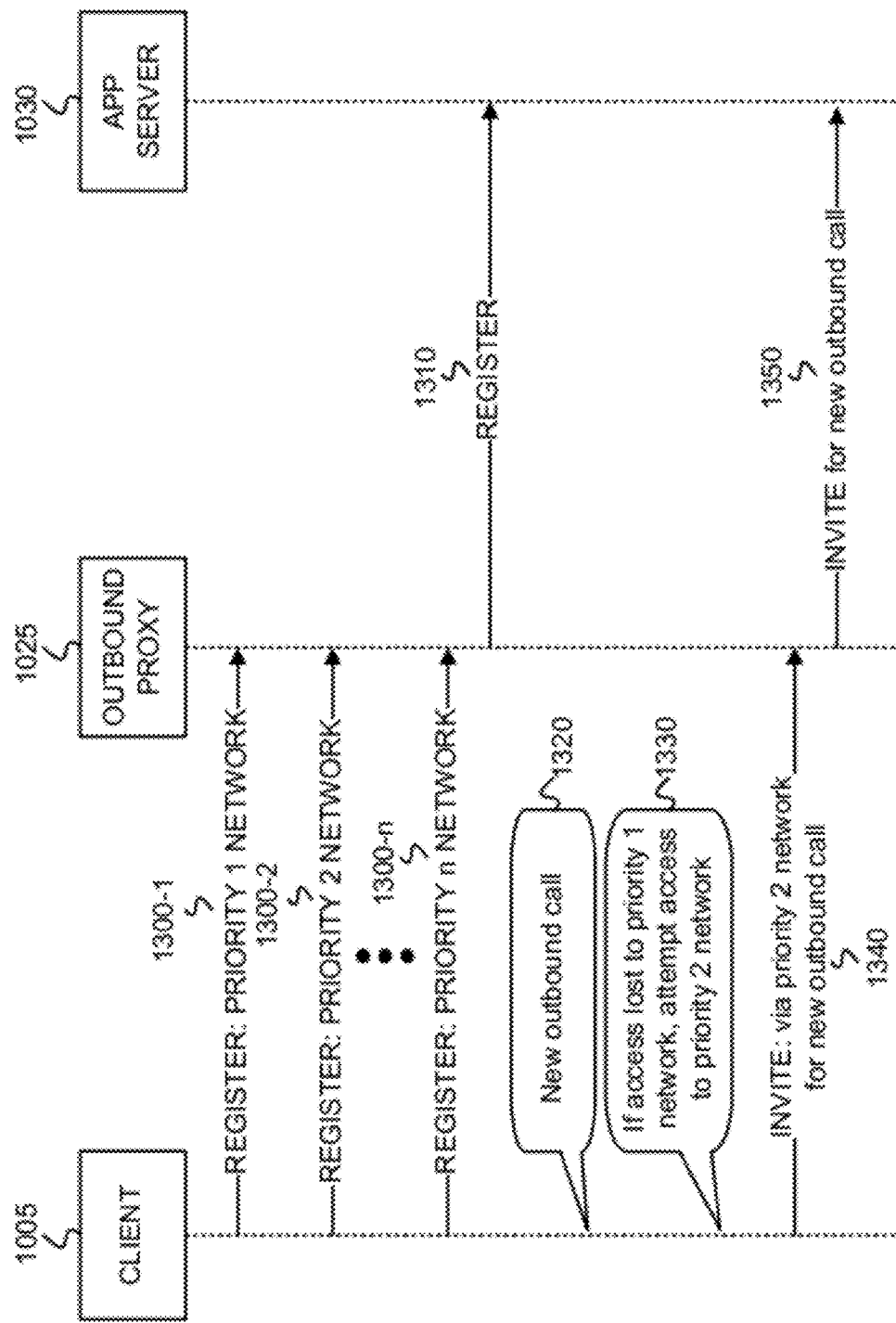
Figure 14:
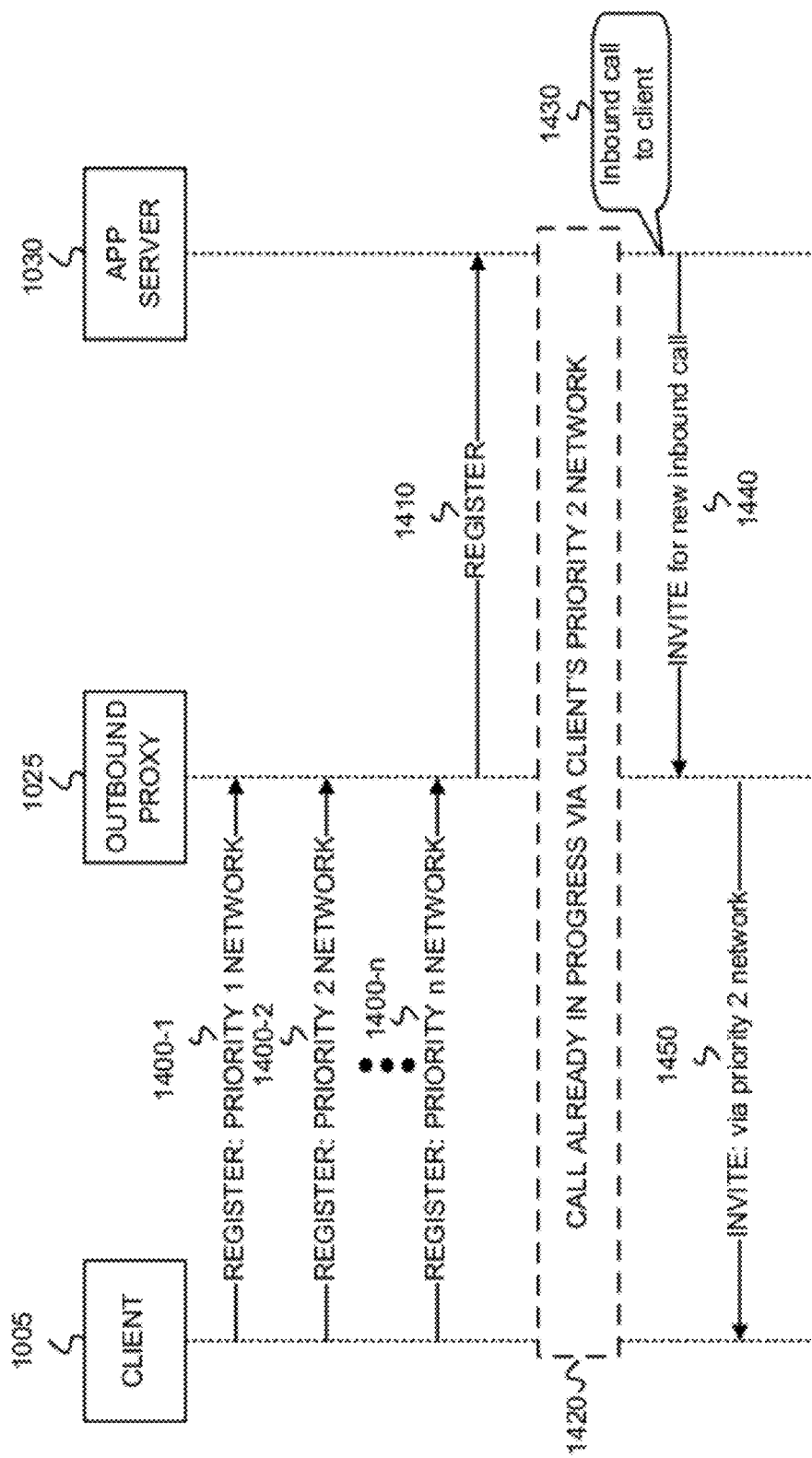
Figure 15:
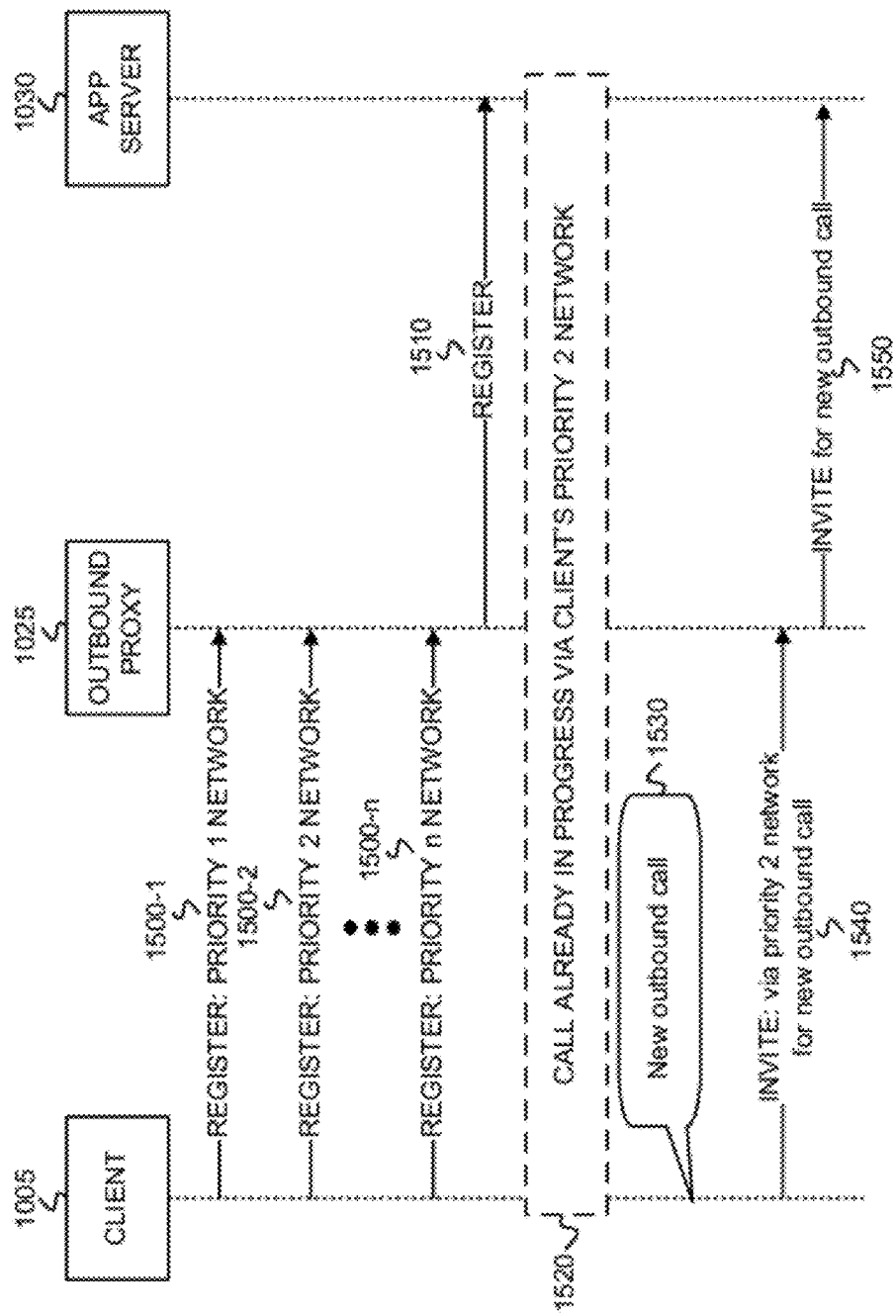
Figure 16:
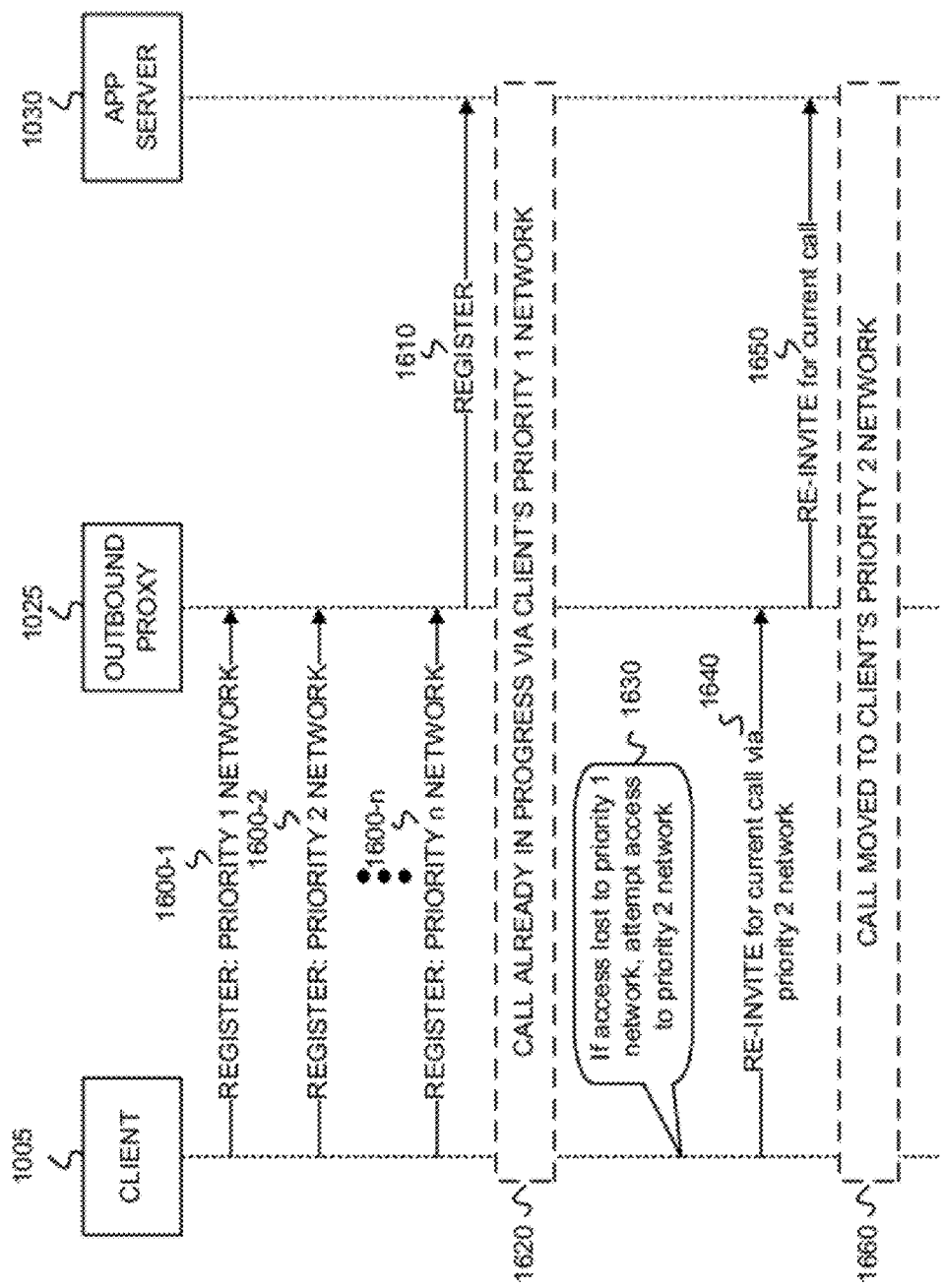
Figure 17A:
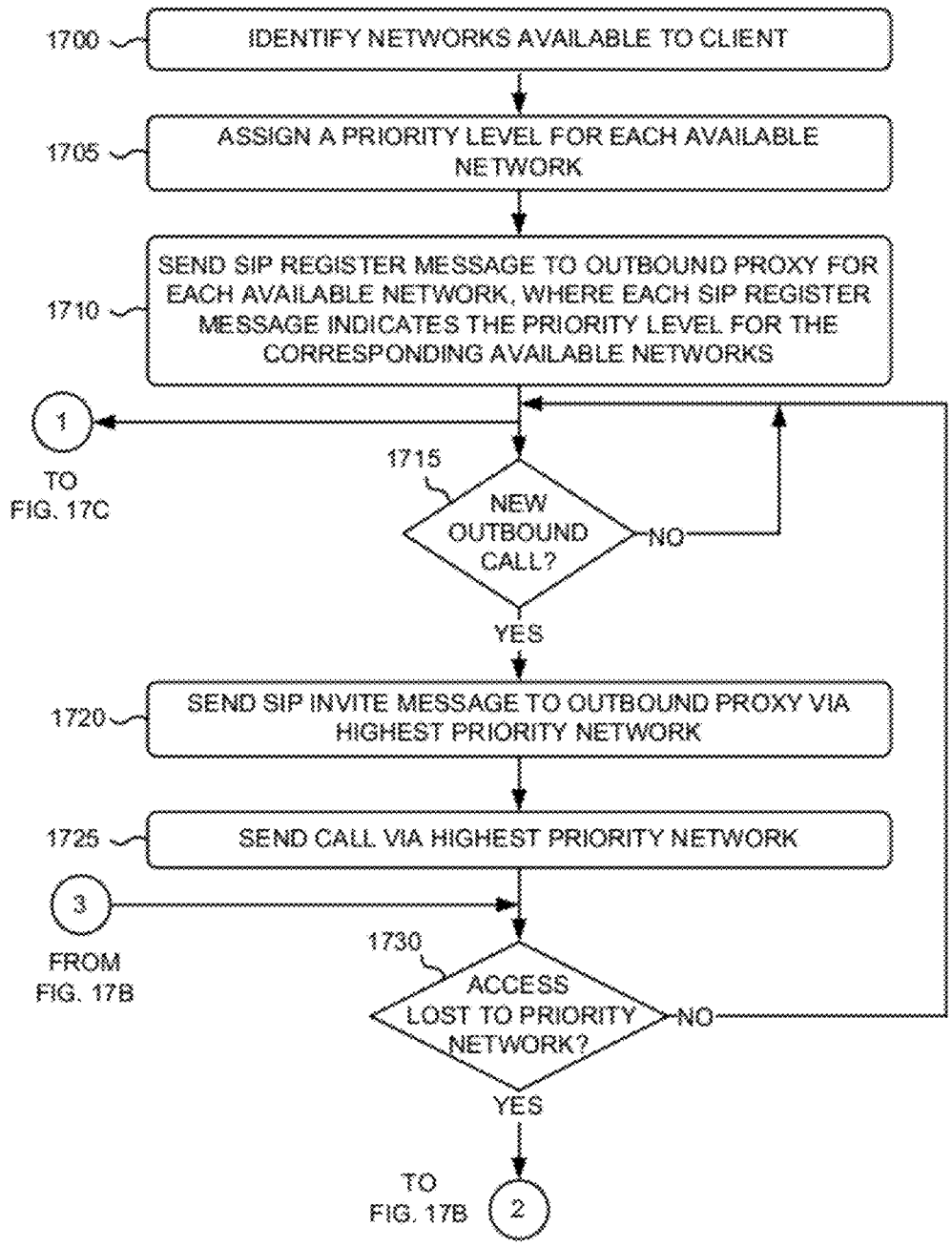
FIGS. 17A-17D are flow diagrams that illustrate an exemplary process for the registration of multiple, different networks and the maintenance of call continuity, at client 1005, via the multiple networks from the standpoint of the client of FIG. 10.
Figure 17B:
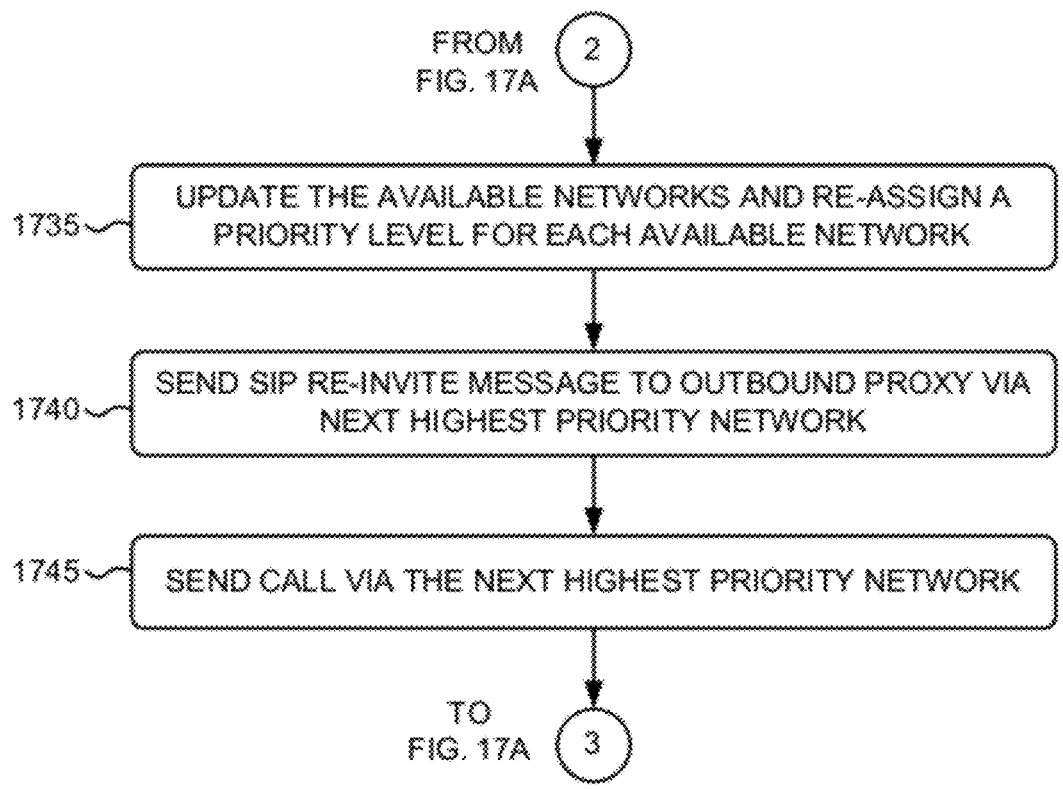
Figure 17C:
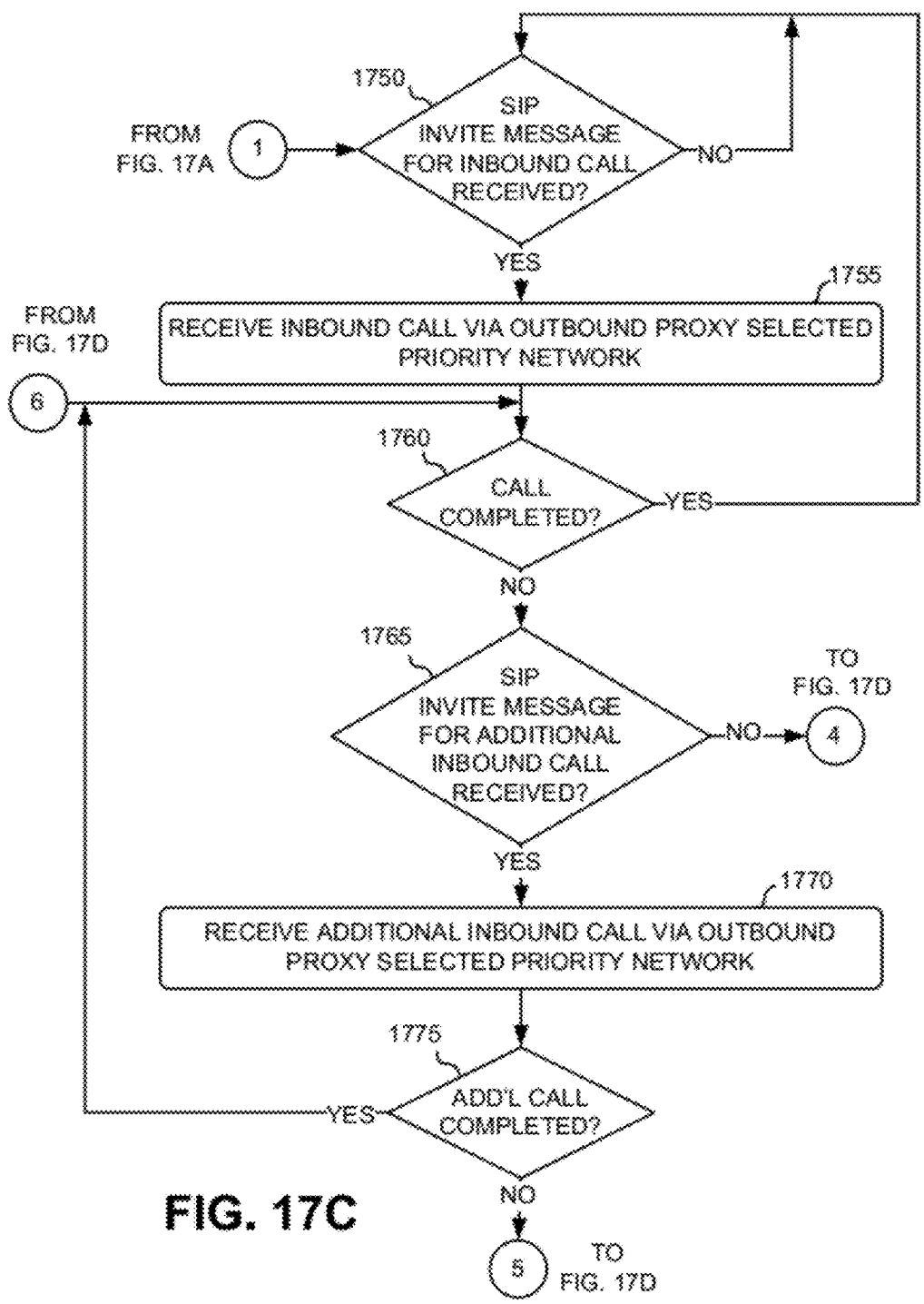
Figure 17D:
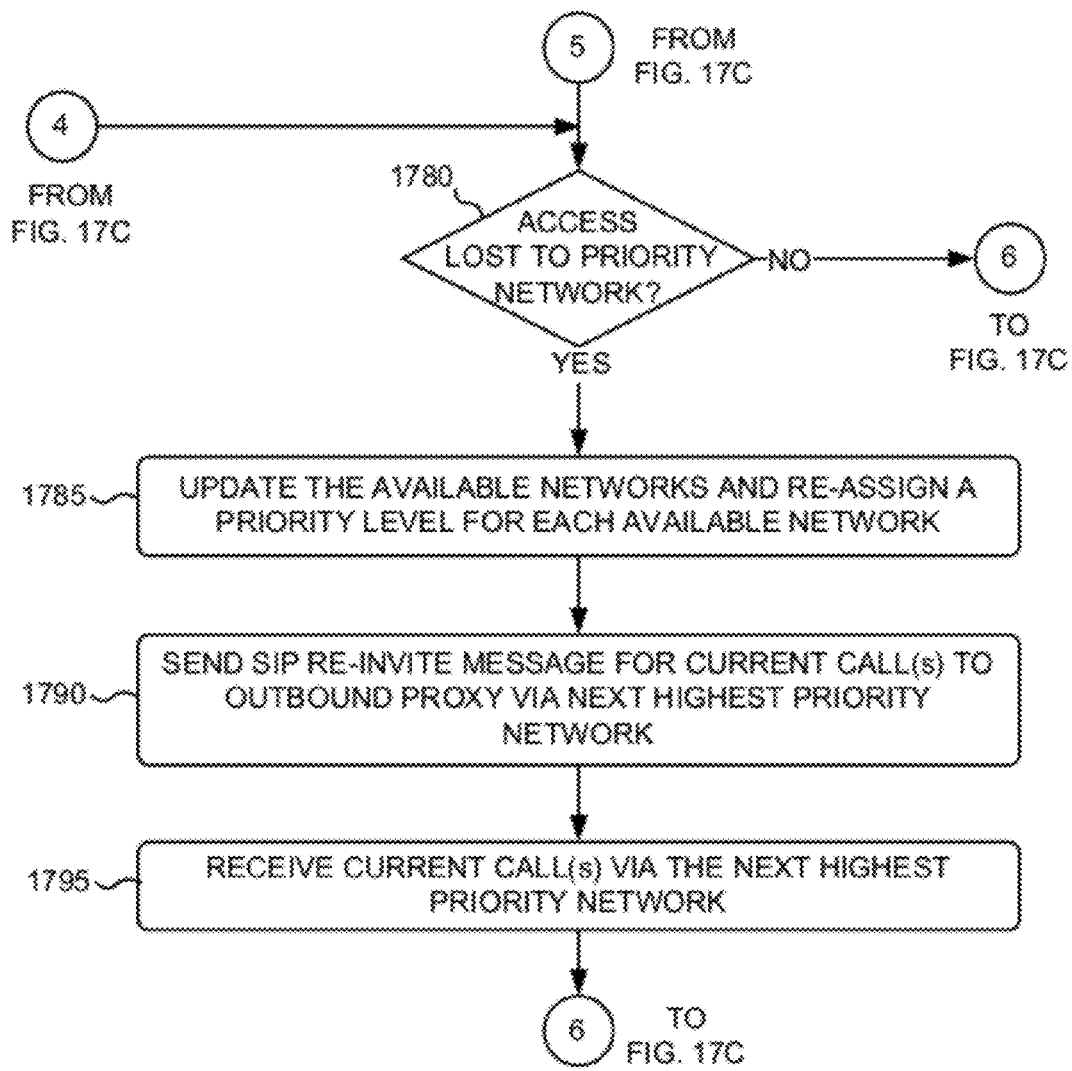
Figure 18A:
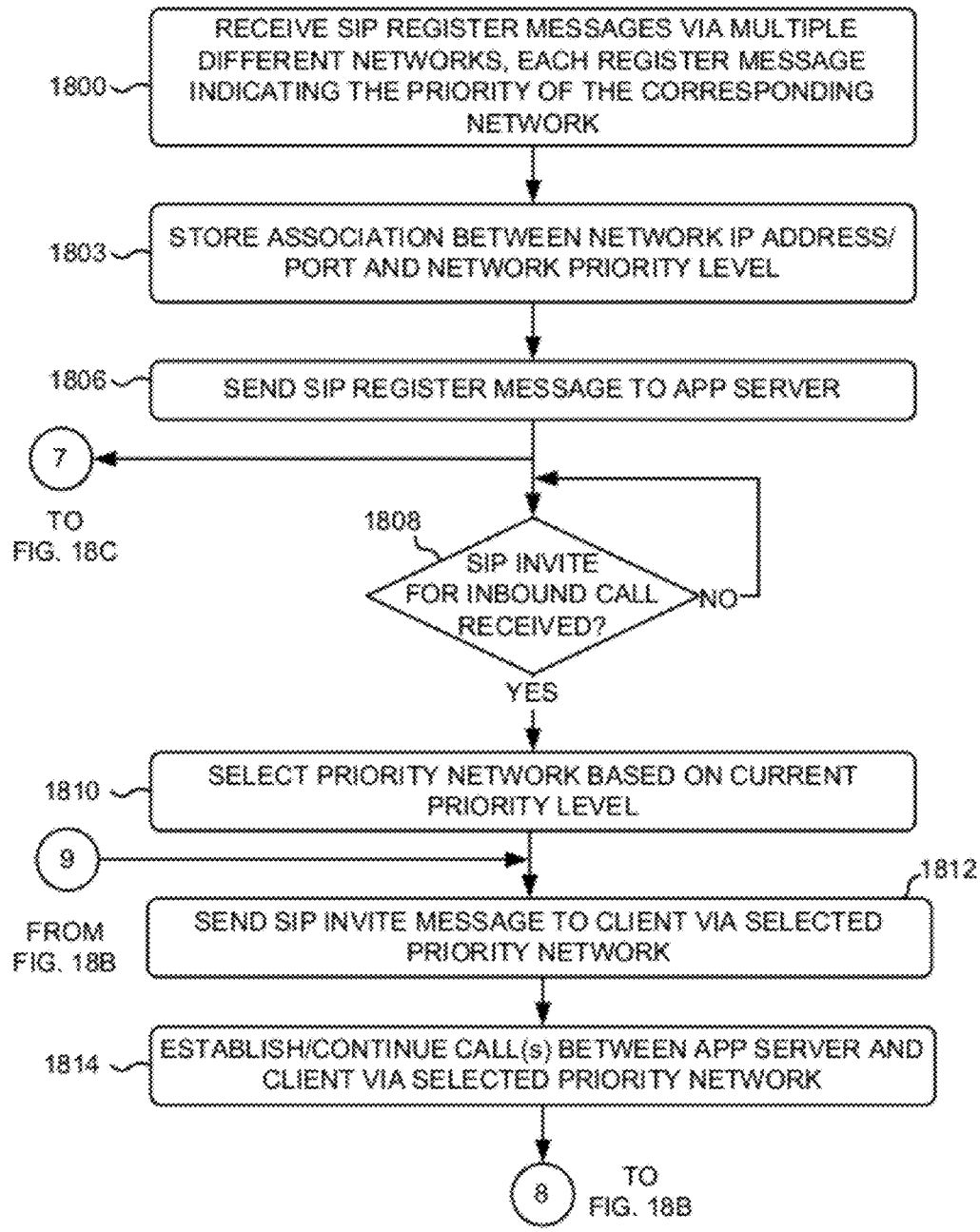
Figure 18B:
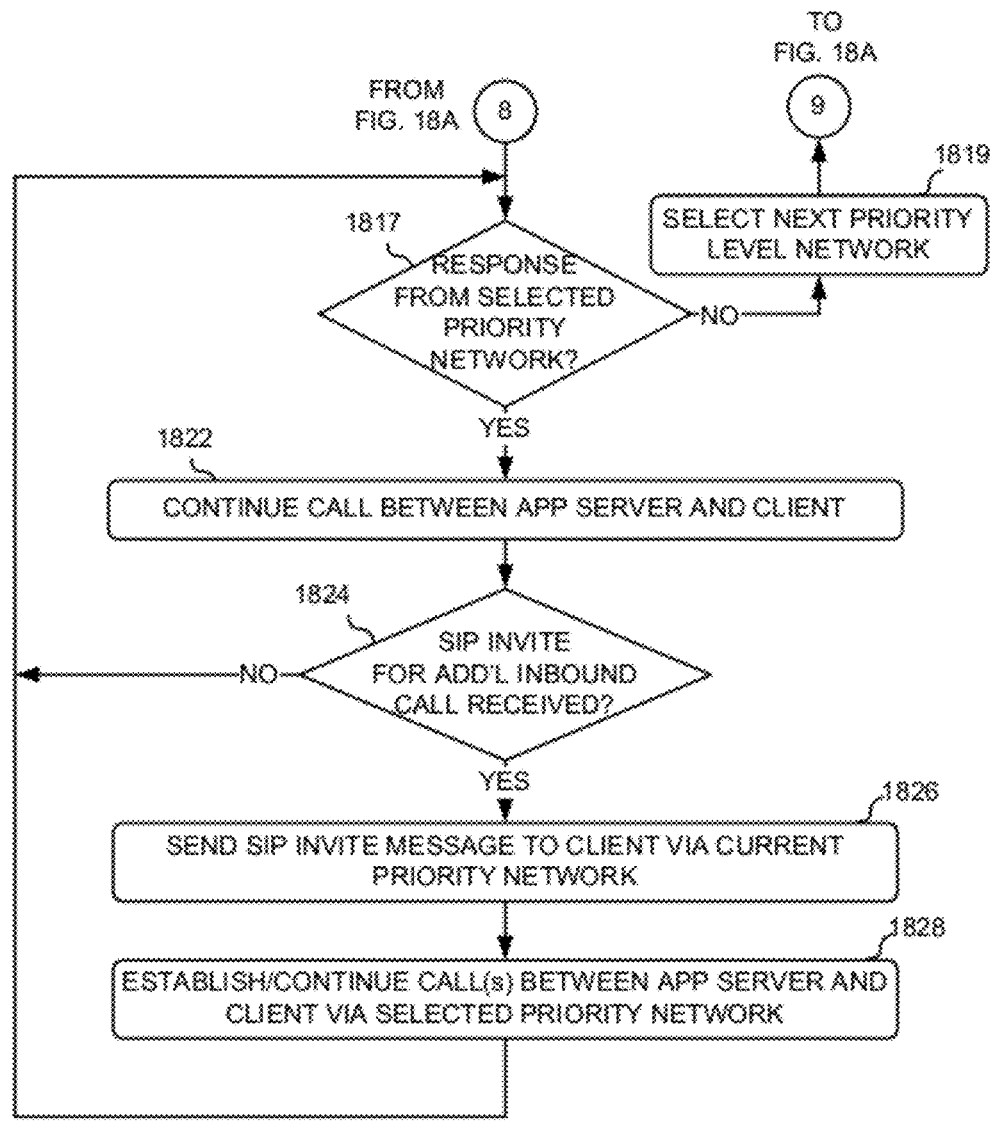
Figure 18D:
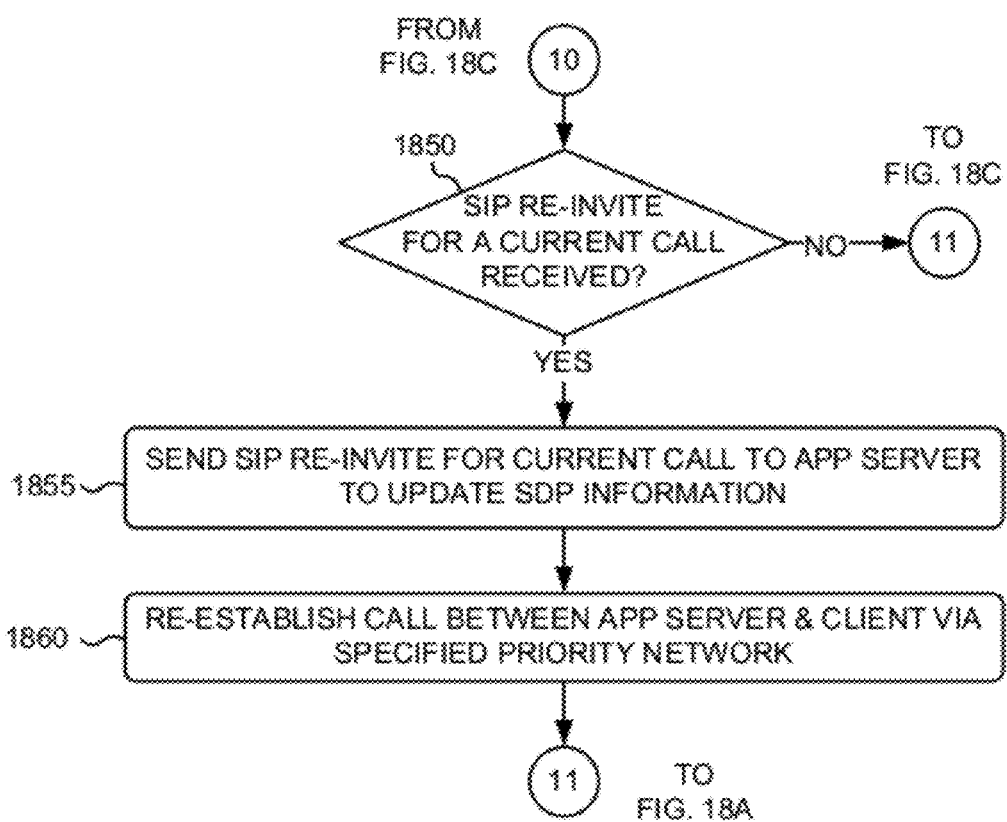

FIGS. 12-16 are diagrams that depict exemplary SIP messaging associated with routing a VoIP call(s) via one of multiple networks. FIG. 12 depicts an instance where an inbound call arrives at outbound proxy 1025 from app server 1030 and outbound proxy 1025 must route the call to client 1005 via a highest priority network available to outbound proxy 1025. FIG. 13 depicts an instance where client 1005 routes an outbound call via a highest priority network available at the time the call is made. FIG. 14 depicts an instance where a SIP invite message associated with a second inbound call from app server 1030 is received at outbound proxy 1025, and outbound proxy 1025 routes the call via the priority network in use for a first call already in progress. FIG. 15 depicts an instance where client 1005 routes a second outbound call via the priority network in use for a first call already in progress. FIG. 16 depicts an instance where client 1005 moves a call in progress from one priority network to another priority network, such as, for example, in the situation where access is lost to the first priority network. The exemplary messaging depicted in FIGS. 12-16 represent simplified versions of the SIP signaling associated with the setting up, routing, and re-routing of calls. FIGS. 12-16 depict only the messaging relevant to the call routing or re-routing associated with the specific instance, and do not show all messaging required for normal call setup.

FIG. 12 depicts an instance where an inbound call arrives at outbound proxy 1025 from app server 1030, and outbound proxy 1025 must route the call to client 1005 via a highest priority network available to outbound proxy 1025. As shown in FIG. 12, client 1005 may initially send SIP register messages 1200-1 through 1200-n via each of priority networks 1015-1 through 1015-n via respective interfaces at mobile device 105 to maintain active registrations with each of priority networks 1015-1 through 1015-n. Each of SIP register messages 1200-1 through 1200-n may include data identifying a priority level of the network over which the register message is sent. Client 1005 may assign priority levels to each currently available network. In turn, outbound proxy 1025 may send a SIP register message 1210 to app server 1030 that includes all of the individual registrations sent via networks 1015-1 through 1015-n. App server 1030 may subsequently have an inbound call 1220 to send to client 1005. App server 1030 may send a SIP invite message 1230 for the inbound call to outbound proxy 1025. Upon receipt of SIP invite message 1230, outbound proxy 1025 may send a SIP invite message 1240 via the registered priority 1 network (e.g., network 1015-1) to setup the call between app server 1030 and client 1005. However, in the case where there is no response 1250 from the priority 1 network (or there is poor QoS via the priority network), a failover may occur to the priority 2 network (e.g., network 1015-2). Therefore, outbound proxy 1025 may send a second SIP invite message 1260 to client 1005 via the priority 2 network to setup the call between app server 1030 and client 1005 via the priority 2 network. In the case where there is also no response 1270 from the priority 2 network, a failover may occur to the next priority network (e.g., network 1015-n). In this case, outbound proxy 1025 may send another SIP invite message 1280 to client 1005 via the next priority network (e.g., priority n network 1015-n) to setup the call between app server 1030 and client 1005 via the priority n network.

FIG. 13 depicts an instance where client 1005 routes an outbound call via a highest priority network available at the time the call is made. As shown in FIG. 13, client 1005 may initially send SIP register messages 1300-1 through 1300-n via each of priority networks 1015-1 through 1015-n via respective interfaces of mobile device 105 to maintain active registrations with each of priority networks 1015-1 through 1015-n. Each of SIP register messages 1300-1 through 1300-n may include data identifying a priority level of the network over which the register message is sent. Client 1005 may assign priority levels to each currently available network. In turn, outbound proxy 1025 may send a SIP register message 1310 to app server 1030 that includes all of the individual registrations sent via networks 1015-1 through 1015-n. Client 1005 may subsequently have a new outbound call 1320 to send to app server 1030. Client 1005 may determine whether access has been lost to the priority 1 network (e.g., network 1015-1) and, if so, client 1005 may attempt 1330 to access the priority 2 network (e.g., network 1015-2). If the attempt to access the priority 2 network is successful, then client 1005 may send a SIP invite message 1340 for the new outbound call via the priority 2 network to outbound proxy server 1025. In turn, outbound proxy 1025 may send a SIP invite message 1350 for the new outbound call to app server 1030 to establish the call between client 1005 and app server 1030.

FIG. 14 depicts an instance where a SIP invite message associated with a second inbound call from app server 1030 is received at outbound proxy 1025 and outbound proxy 1025 routes the call via the priority network in use for a first call already in progress. As shown in FIG. 14, client 1005 may initially send SIP register messages 1400-1 through 1400-n via each of priority networks 1015-1 through 1015-n via respective interfaces at client 1005 to maintain active registrations with each of priority networks 1015-1 through 1015-n. Each of SIP register messages 1400-1 through 1400-n may include data identifying a priority level of the network which the register message is sent. Client 1005 may assign priority levels to each currently available network. In turn, outbound proxy 1025 may send a SIP register message 1410 to app server 1030 that includes all of the individual registrations sent via networks 1015-1 through 1015-n. Subsequently, a call 1420 between client 1005 and app server 1030 (or another node) may already be in progress via the priority 2 network. App server 1030 may have a new inbound call 1430 destined for client 1005. App server 1030 may send a SIP invite message 1440 for the new inbound call to outbound proxy 1025. In turn, outbound proxy 1025 may send a SIP invite message 1450 via the priority 2 network to client 1005 to establish the call between app server 1030 and client 1005.

FIG. 15 depicts an instance where client 1005 routes a second outbound call via the priority network currently in use for a first call already in progress. As shown in FIG. 15, client 1005 may initially send SIP register messages 1500-1 through 1500-n via each of priority networks 1015-1 through 1015-n via respective interfaces of mobile device 105 to maintain active registrations with each of priority networks 1015-1 through 1015-n. Each of SIP register messages 1500-1 through 1500-n may include data identifying a priority level of the network over which the register message is sent. Client 1005 may assign priority levels to each currently available network. In turn, outbound proxy 1025 may send a SIP register message 1510 to app server 1030 that includes all of the individual registrations sent via networks 1015-1 through 1015-$n$. Subsequently, a call 1520 between client 1005 and app server 1030 (or another node) may already be in progress via the priority 2 network. Client 1005 may have a new outbound call 1530 for sending to app server 1030. Client 1005 may send a SIP invite message 1540, for the new outbound call, via the priority 2 network currently being used for the other call already in progress to outbound proxy 1025. In turn, outbound proxy 1025 may send a SIP invite message 1550 for the new outbound call to app server 1030 to establish the call between client 1005 and app server 1030.

FIG. 16 depicts an instance where client 1005 moves a call in progress from one priority network to another priority network, such as, for example, in the situation where access is lost to the first priority network (or poor QoS exists over the first priority network). As shown in FIG. 16, client 1005 may initially send SIP register messages 1600-1 through 1600-$n$ via each of priority networks 1015-1 through 1015-$n$ via respective interfaces of mobile device 105 to maintain active registrations with each of priority networks 1015-1 through 1015-$n$. Each of SIP register messages 1600-1 through 1600-$n$ may include data identifying a priority level of the network over which the register message is sent. Client 1005 may assign priority levels to each currently available network. In turn, outbound proxy 1025 may send a SIP register message 1610 to app server 1030 that includes all of the individual registrations sent via networks 1015-1 through 1015-$n$. Subsequently, a call 1620 between client 1005 and app server 1030 (or another node) may already be in progress via the priority 1 network (e.g., network 1015-1). Client 1005 may determine whether access has been lost to the priority 1 network (e.g., network 1015-1) and, if so, client 1005 may attempt 1630 to access the priority 2 network (e.g., network 1015-2). If the attempt to access the priority 2 network is successful, then client 1005 may send a SIP re-invite message 1640 for the in-progress call to outbound proxy 1025 via the priority 2 network. In turn, outbound proxy 1025 may send a SIP re-invite message 1650 for the in-progress call to app server 1030 so that the in-progress call may be moved 1660 to the priority 2 network.

FIGS. 17A-17D are flow diagrams that illustrate an exemplary process for the registration of multiple, different networks and the maintenance of call continuity, at client 1005, via the multiple networks. The exemplary process of FIG. 17A-17D may be implemented by client 1005.

The exemplary process may include identifying the networks available to client 1005 (block 1700). Client 1005 may, via communication I/Fs 780 and/or USB I/F 790 of mobile device 105, determine the availability of each of networks 1015-1 through 1015-$n$. Client 1005 may assign a priority level for each available network identified in block 1700 (block 1705). Client 1005 may, via the priority level, specify a preference for each of networks 1015-1 through 1015-$n$. The assigned priority levels may include priority levels from highest (e.g., most preferable) to lowest (e.g., least preferable). Therefore, a highest priority network will be the first network attempted to be used, the next highest priority network will be the second network attempted to be used, etc. The assigned priority levels may depend on the docking state of mobile device 105 with docking station 110. For example, if mobile device 105 is docked with docking station 110, client 1005 may assign a priority level of 1 to wired LAN/WAN 1015-1 and a priority level of 2 to wireless LAN/WAN 1015-2.

Client 1005 may send a SIP register message to outbound proxy 1025 for each available network, where each SIP register message indicates the priority level for the corresponding available network (block 1710). Each SIP register message may include an indication of the priority level and a network address and/or port associated with reaching client 1005 via the corresponding network. Subsequent to block 1710, the exemplary process may continue with two separate sequences of blocks being performed in parallel. The two separate sequences may start with block 1715 and block 1750. Therefore, after block 1710, the exemplary process may continue at blocks 1715 through 1745 in parallel with blocks 1750 through 1795.

Client 1005 may determine if there is a new outbound call (block 1715). If so (YES—block 1715), then client 1005 may send a SIP invite message to outbound proxy 1025 via the highest priority network (block 1720). The SIP invite message may be used to set-up a session/call between client 1005 and app server 1030. Client 1005 may send the call via the highest priority network (block 1725). Client 1005 may determine whether access has been lost to the current priority network (block 1730). If not, then the exemplary process may return to block 1715 with another determination of whether there is a new outbound call. If client 1005 has lost access to the current priority network (YES—block 1730), then client 1005 may update the available networks and re-assign a priority level for each available network (block 1735). Client 1005 may send a SIP re-invite message to outbound proxy 1025 via the next highest priority network (block 1740). Client 1005 may send the call via the next highest priority network (block 1745). At block 1750, client 1005 may determine whether a SIP invite message for an inbound call is received from outbound proxy 1025 (block 1750). If so, the client 1005 may receive an inbound call via a priority network selected by outbound proxy 1025 (block 1755).

Client 1005 may determine whether the call has completed (block 1760). If so (YES—block 1760), then the exemplary process may return to block 1750. If the call has not completed (NO—block 1760), then client 1005 may determine if a SIP invite message for an additional inbound call has been received from outbound proxy 1025 (block 1765). If not (NO—block 1765), then the exemplary process may continue at block 1780. If a SIP invite message for an additional inbound call has been received (YES—block 1765), then client 1005 may receive the additional inbound call via a priority network selected by outbound proxy 1025 (block 1770). Client 1005 may then determine whether the additional call has completed (block 1775). If so (YES—block 1775), then the exemplary process may return to block 1760. If the additional call has not completed (NO—block 1775), then client 1005 may determine if client 1005 has lost access to the current priority network (block 1780). If not (NO—block 1780), then the exemplary process may return to block 1760. If client 1005 has lost access to the current priority network (YES—block 1780), then client 1005 may update the available networks and re-assign a priority level for each available network (block 1785). Client 1005 may send a SIP re-invite message for the current call(s) to outbound proxy 1025 via the next highest priority network (block 1790). Client 1005 may receive the current call(s) via the next highest priority network (block 1795), and the exemplary process may return to block 1760.

FIGS. 18A-18D are flow diagrams that illustrate an exemplary process for the registration of multiple, different networks, and the maintenance of call continuity, at outbound proxy 1025, via the multiple networks. The exemplary process of FIG. 18A-18D may be implemented by outbound proxy 1025.

The exemplary process may include outbound proxy 1025 receiving SIP register messages via multiple different networks, with each register message indicating the priority of the corresponding network (block 1800). Each register message may also indicate a network address and/or port associated with reaching mobile device 105 via the corresponding network. In some implementations, outbound proxy 1025 may monitor each registration path for QoS. Such monitoring may include, for example, monitoring SIP register messages for timing issues and/or packet loss, and/or sending SIP Ping, or other Null packets, along each registration path to test for QoS. Outbound proxy 1025 may additionally implement rules that allow or disallow certain types of calls or sessions over certain networks. For example, outbound proxy 1025 may implement rules that allow Voice and Video (e.g., high definition (HD) video) over wired LAN/WAN 1015-1, but allow only Voice over wireless LAN/WAN 1015-2 or wireless cellular network 1015-n. Outbound proxy 1025 may store an association between the network IP address and/or port associated with the mobile device 105 from which the registration messages are received and the network priority levels for each corresponding network (block 1803). Outbound proxy 1025 may send a SIP register message to app server 1030 (block 1806). Subsequent to block 1806, the exemplary process may continue with two separate sequences of blocks being performed in parallel. The two separate sequences may start with block 1808 and block 1830. Therefore, after block 1806, the exemplary process may continue at blocks 1808 through 1828 in parallel with blocks 1830 through 1860.

Outbound proxy 1025 may determine if a SIP invite message for an inbound call has been received (block 1808). If so (YES—block 1808), then outbound proxy 1025 may select a priority network based on a current priority level (block 1810). For example, if the current priority level is 1, then priority network 1 (e.g., network 1015-1) may be selected. Outbound proxy 1025 may send a SIP invite message to client 1005 via the selected priority network (block 1812). Outbound proxy 1025 may establish/continue a call(s) between app server 1030 and client 1005 via the selected priority network (block 1814).

Outbound proxy 1025 may determine whether any response occurs over the selected priority network during a period of time (block 1817). Outbound proxy 1025 may wait a configurable period of time for a response, or may attempt a number of retries over a configurable period of time. If no response is received (NO—block 1817), then outbound proxy 1025 may select a next priority level priority (block 1819) and the exemplary process may return to block 1812. For example, if there is no response from the priority level 1 network, then outbound proxy 1025 may select the priority 2 level network.

If a response occurs over the selected priority network during the period of time (YES—block 1817), the outbound proxy 1025 may continue the call between app server 1030 and client 1005 (block 1822). Outbound proxy 1025 may determine whether a SIP invite message for an additional inbound call is received (block 1824). Outbound proxy 1025 may handle multiple inbound calls destined for client 1005 at the same time. If no SIP invite message for an additional inbound call is received (NO—block 1824), then the exemplary process may return to block 1817. If a SIP invite message for an additional inbound call is received (YES—block 1824), then outbound proxy 1025 may send a SIP invite message to client 1005 via the current priority network (block 1826). Outbound proxy 1025 may establish/continue the call (s) between app server 1030 and client 1005 via the selected priority network (block 1828).

At block 1830, outbound proxy 1025 may determine if a SIP invite message for an outbound call has been received from client 1005. If so (YES—block 1830), then outbound proxy 1025 may send a SIP invite message to app server 1030 for the outbound call (block 1833). Outbound proxy 1025 may establish a call between app server 1030 and client 1005 via the current priority network (block 1835). Outbound proxy 1025 may determine if the call has completed (block 1837). If so (YES—block 1837), then the exemplary process may return to block 1830. If the call has not completed (NO—block 1837), then outbound proxy 1025 may determine whether a SIP invite message for an additional outbound call has been received (block 1839). If not (NO—block 1839), then the exemplary process may continue at block 1850 below. If a SIP invite message for an additional outbound call has been received (YES—block 1839), then outbound proxy 1025 may send a SIP invite message to app server 1030 for the additional outbound call (block 1841). Outbound proxy 1025 may establish the additional call between app server 1030 and client 1005 via the current priority network (block 1843). Outbound proxy 1025 may determine if the additional call has completed (block 1845). If not (NO—block 1845), then the exemplary process may continue at block 1850 below. If the additional call has completed (YES—block 1845), then the exemplary process may return to block 1837.

At block 1850, outbound proxy 1025 may determine if a SIP re-invite message for a current call has been received. If not (NO—block 1850), then the exemplary process may return to block 1837. If a SIP re-invite message for a current call has been received, then outbound proxy 1025 may send a SIP re-invite message for the current call to app server 1030 to update the Session Description Protocol (SDP) information (block 1855). Outbound proxy 1025 may re-establish the call between app server 1030 and client 1005 via the priority network specified in the SIP re-invite message (block 1860). The exemplary process may then return to block 1837.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 8, 17A-17D, and 18A-18D, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A mobile device, comprising:
a first communication interface configured to communicate via a first connection over a first network;
a second communication interface configured to communicate via a second connection over a second network;
a third communication interface configured to communicate via a third connection over a third network; and
a processing unit configured to:
determine a docking status associated with docking or undocking of the mobile device from a docking station,
assign different priority levels to the first, second and third networks based on the docking status of the mobile device,
cause registration messages for the first, second and third networks to be sent to a network proxy, wherein each of the registration messages indicate one of the different priority levels assigned to a respective one of the first, second and third networks,
cause, if the determined docking status comprises a first docking status, Voice over Internet Protocol (VoIP) traffic associated with a VoIP call to be transmitted and received via one of the first, second or third communication interfaces that corresponds to one of the first, second or third networks assigned a highest priority level of the assigned priority levels,
select one of the first, second or third networks that has a second highest priority level of the assigned priority levels based on a change in the docking status of the mobile device to a second docking status, and
cause the VoIP traffic associated with the VoIP call to be transmitted and received via the selected one of the first, second or third networks that has the second highest priority level of the assigned priority levels and the corresponding first, second or third communication interface.

2. The mobile device of claim 1, wherein the first docking status comprises the mobile device docked with the docking station and the second docking status comprises the mobile device undocked from the docking station.

3. The mobile device of claim 1, wherein the second and third connections comprise different wireless connections and wherein the first connection comprises a wired connection.

4. The mobile device of claim 1, wherein the first docking status comprises the mobile device undocked from the docking station and the second docking status comprises the mobile device docked with the docking station.

5. The mobile device of claim 1, wherein the first network comprises a wired local area network (LAN) or wide area network (WAN), the second network comprises a wireless cellular network, and the third network comprises a wireless LAN or WAN.

6. A method, comprising:
identifying, at a mobile device, multiple networks available to the mobile device for connection, wherein the mobile device is dockable with a docking station;
assigning different priority levels to the identified multiple available networks based on a docking status of the mobile device with the docking station;
sending multiple registration messages to a network proxy for the identified multiple available networks, wherein each of the multiple registration messages indicate one of the different priority levels assigned to a respective one of the multiple available networks;
sending a first set-up message to the network proxy to set-up a Voice over Internet Protocol (VoIP) call between the mobile device and a VoIP server;
sending, from the mobile device, the VoIP call via a network of the multiple available networks that is assigned a highest priority level of the assigned priority levels;
determining if access has been lost to the network assigned the highest priority level of the assigned priority levels;
sending a second set-up message, via a second network having a second highest priority level of the assigned different priority levels, to the network proxy to set-up the VoIP call between the mobile device and the VoIP server; and
sending the VoIP call via the second network assigned the second highest priority level of the assigned priority levels.

7. The method of claim 6, wherein determining if the access has been lost to the network that is assigned the highest priority level of the assigned priority levels comprises:
determining that access has been lost to the network that is assigned the highest priority level if the mobile device is undocked from the docking station.

8. The method of claim 6, wherein determining if the access has been lost to the network that is assigned the highest priority level of assigned priority levels comprises:
determining that access has not been lost to the network that is assigned the highest priority network if the mobile device is docked with the docking station.

9. The method of claim 6, further comprising:
identifying, subsequent to a determination that the access has been lost to the network that is assigned the highest priority level of the assigned priority levels, multiple networks that are currently available to the mobile device; and
re-assigning different priority levels to the identified multiple, currently available networks based on the docking status of the mobile device with the docking station.

10. The method of claim 6, wherein sending the first set-up message to the network proxy comprises:
sending the first set-up message to the network proxy via the network of the multiple available networks that is assigned the highest priority level of the assigned priority levels.

11. The method of claim 6, wherein the registration messages comprise Session Initiation Protocol (SIP) Register messages.

12. The method of claim 6, wherein the first set-up message comprises a Session Initiation Protocol (SIP) invite message.

13. The method of claim 6, wherein the docking status comprises the mobile device docked with the docking station.

14. The method of claim 6, wherein the docking status comprises the mobile device undocked from the docking station.

15. A non-transitory computer-readable medium containing instructions executable by at least one processor, the computer-readable medium comprising:
one or more instructions for identifying multiple networks available to a mobile device for connection, wherein the mobile device is dockable with a docking station;
one or more instructions for assigning different priority levels to the identified multiple available networks based on a docking status of the mobile device with the docking station;
one or more instructions for causing multiple registration messages for the identified multiple available networks to be sent to a network proxy, wherein each of the multiple registration messages indicate one of the different priority levels assigned to a respective one of the multiple available networks;

one or more instructions for causing a first set-up message to be sent to the network proxy to set-up a Voice over Internet Protocol (VoIP) call between the mobile device and a VoIP server;

one or more instructions for causing the VoIP call to be sent via a network of the multiple available networks that is assigned a highest priority level of the assigned priority levels;

one or more instructions for determining if access has been lost to the network that is assigned the highest priority level of the assigned priority levels;

one or more instructions for causing a second set-up message to be sent, via a second network assigned a second highest priority level of the assigned different priority levels, to the network proxy to set-up the VoIP call between the mobile device and the VoIP server; and one or more instructions for causing the VoIP call to be sent via the second network assigned the second highest priority level of the assigned priority levels.

16. The non-transitory computer-readable medium of claim 15, wherein the one or more instructions for determining if the access has been lost to the network assigned to the highest priority level of the assigned priority levels comprise:

one or more instructions for determining that access has been lost to the network assigned to highest priority level if the mobile device is undocked from the docking station.

17. The non-transitory computer-readable medium of claim 15, wherein the one or more instructions for determining if the access has been lost to the network assigned to the highest priority level of the assigned priority levels comprises:

one or more instructions for determining that access has not been lost to the network assigned to highest priority level if the mobile device is docked with the docking station.

18. The non-transitory computer-readable medium of claim 15, further comprising:

one or more instructions for identifying, subsequent to a determination that the access has been lost to the network assigned the highest priority level of the assigned priority levels, multiple networks that are available to the mobile device; and one or more instructions for updating priority levels assigned to the identified multiple available networks based on the docking station of the mobile device with the docking station.

19. The non-transitory computer-readable medium of claim 15, wherein the one or more instructions for sending the set-up message to the network proxy comprises:

one or more instructions for cause the first set-up message to be sent to the network proxy via the network of the multiple available networks that is assigned the highest priority level of the assigned priority levels.

20. The non-transitory computer-readable medium of claim 15, wherein the registration messages comprise Session Initiation Protocol (SIP) Register messages.

21. The non-transitory computer-readable medium of claim 15, wherein the first set-up message comprises a Session Initiation Protocol (SIP) invite message.

22. The non-transitory computer-readable medium of claim 15, wherein the docking status comprises the mobile device docked with the docking station.

23. The non-transitory computer-readable medium of claim 15, wherein the docking status comprises the mobile device undocked from the docking station.

* * * * *